(12) United States Patent
Tian et al.

(10) Patent No.: US 10,999,014 B2
(45) Date of Patent: May 4, 2021

(54) HYBRID AUTOMATIC REPEAT REQUEST (HARQ) IN A WIRELESS LOCAL AREA NETWORK (WLAN)

(71) Applicant: QUALCOMM Incorporated, San Diego, CA (US)

(72) Inventors: Bin Tian, San Diego, CA (US); Hemanth Sampath, San Diego, CA (US); Sameer Vermani, San Diego, CA (US); Lin Yang, San Diego, CA (US); Dung Ngoc Doan, San Diego, CA (US); Simone Merlin, San Diego, CA (US); Alfred Asterjadhi, San Diego, CA (US); Jialing Li Chen, San Diego, CA (US); Stephen Jay Shellhammer, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/536,280

(22) Filed: Aug. 8, 2019

(65) Prior Publication Data
US 2020/0052832 A1 Feb. 13, 2020

Related U.S. Application Data

(60) Provisional application No. 62/717,218, filed on Aug. 10, 2018, provisional application No. 62/758,508, (Continued)

(51) Int. Cl.
*H04L 1/00* (2006.01)
*H04L 1/18* (2006.01)
*H04W 84/12* (2009.01)

(52) U.S. Cl.
CPC .......... *H04L 1/1812* (2013.01); *H04L 1/0009* (2013.01); *H04L 1/0057* (2013.01); *H04W 84/12* (2013.01)

(58) Field of Classification Search
CPC ... H04L 1/0003; H04L 1/0009; H04L 1/0026; H04L 1/0031; H04L 1/0057;
(Continued)

(56) References Cited

U.S. PATENT DOCUMENTS

| 2014/0126580 A1* | 5/2014 | Sampath ............... H04L 1/1819 370/428 |
| 2015/0236822 A1* | 8/2015 | Pirskanen ........... H04W 72/044 370/329 |

(Continued)

FOREIGN PATENT DOCUMENTS

WO     2015006640     1/2015

OTHER PUBLICATIONS

"PCT Application No. PCT/US2019/045882 International Search Report and Written Opinion", dated Nov. 5, 2019, 14 pages.

*Primary Examiner* — Robert J Lopata
(74) *Attorney, Agent, or Firm* — Qualcomm Inc (DL)

(57) ABSTRACT

This disclosure provides systems, methods, and apparatus, including computer programs encoded on computer-readable media, for implementing a hybrid automatic repeat request (HARQ) protocol in a wireless local area network (WLAN). A station (STA) may send a HARQ transmission to another STA. The HARQ protocol may support the use of different types of feedback from the receiving STA to control the HARQ retransmission process. This disclosure provides example message formats to support HARQ transmission and HARQ feedback in a WLAN.

29 Claims, 20 Drawing Sheets

Related U.S. Application Data filed on Nov. 9, 2018, provisional application No. 62/792,896, filed on Jan. 15, 2019.

(58) Field of Classification Search
CPC ... H04L 1/1614; H04L 1/1671; H04L 1/1812; H04L 1/1819; H04L 1/1845; H04L 1/1864; H04L 1/1874; H04L 1/1893; H04W 84/12
USPC ........................................................ 370/338
See application file for complete search history.

(56) References Cited

U.S. PATENT DOCUMENTS

| | | | |
|---|---|---|---|
| 2015/0245326 A1* | 8/2015 | Rune | H04L 5/006 370/329 |
| 2016/0380727 A1* | 12/2016 | Ryu | H04L 1/18 370/245 |
| 2017/0126363 A1* | 5/2017 | Wang | H04L 1/1671 |
| 2017/0230149 A1* | 8/2017 | Wang | H04L 1/1819 |
| 2017/0346605 A1* | 11/2017 | Chendamarai Kannan | H04L 1/1874 |
| 2018/0270845 A1* | 9/2018 | Urabayashi | H04W 56/0045 |
| 2019/0081746 A1* | 3/2019 | Han | H04L 1/00 |
| 2020/0280399 A1* | 9/2020 | Kim | H04L 1/18 |

\* cited by examiner

| | | | | | | |
|---|---|---|---|---|---|---|
| Max MPDU size (bytes) | 11454 | 11454 | 11454 | 11454 | 11454 | 11454 |
| # bits/byte | 8 | 8 | 8 | 8 | 8 | 8 |
| Max # MPDU | 64 | 128 | 256 | 512 | 1024 |
| Max payload (bits) | 5864448 | 11728896 | 23457792 | 46915584 | 93831168 |
| Lowest code rate | 1/2 | 1/2 | 1/2 | 1/2 | 1/2 | 1/2 |
| Option 1: Max # coded bits (llr_buff_num_bit) | 11728896 | 23457792 | 46915584 | 93831168 | 187662336 |
| Option 2a: Max # coded bytes (llr_buff_num_byte) | 1466112 | 2932224 | 5864448 | 11728896 | 23457792 |
| Option 2b: Max # 648-bit CW (llr_buff_num_cw_648) | 18101 | 36201 | 72401 | 144802 | 289603 |
| Option 2c: Max # 1296-bit CW (llr_buff_num_cw_1296) | 9051 | 18101 | 36201 | 72401 | 144802 |
| Option 2d: Max # 1944-bit CW (llr_buff_num_cw_1944) | 6034 | 12067 | 24134 | 48268 | 96535 |
| Option 1: # bits to signal llr_buff_num_bit | 24 | 25 | 26 | 27 | 28 |
| Option 2a: # bits to signal llr_buff_num_byte | 21 | 22 | 23 | 24 | 25 |
| Option 2b: # bits to signal llr_buff_num_cw_648 | 15 | 16 | 17 | 18 | 19 |
| Option 2c: # bits to signal llr_buff_num_cw_1296 | 14 | 15 | 16 | 17 | 18 |
| Option 2d: # bits to signal llr_buff_num_cw_1944 | 13 | 14 | 15 | 16 | 17 |

FIGURE 14

| MCS in data packet | | | MCS in feedback (11a) | | | MCS in feedback (11n/11ac/11ax/11be) | | |
| --- | --- | --- | --- | --- | --- | --- | --- | --- |
| MCS | QAM | code rate | MCS | QAM | code rate | MCS | QAM | code rate |
| 0 | BPSK | 1/2 | 1101 | BPSK | 1/2 | 0 | BPSK | 1/2 |
| 1 | QPSK | 1/2 | 0101 | QPSK | 1/2 | 1 | QPSK | 1/2 |
| 2 | QPSK | 3/4 | 0101 | QPSK | 1/2 | 1 | QPSK | 1/2 |
| 3 | 16QAM | 1/2 | 1001 | 16QAM | 1/2 | 3 | 16QAM | 1/2 |
| 4 | 16QAM | 3/4 | 1001 | 16QAM | 1/2 | 3 | 16QAM | 1/2 |
| 5 | 64QAM | 2/3 | 1001 | 16QAM | 1/2 | 3 | 16QAM | 1/2 |
| 6 | 64QAM | 3/4 | 1001 | 16QAM | 1/2 | 3 | 16QAM | 1/2 |
| 7 | 64QAM | 5/6 | 1001 | 16QAM | 1/2 | 3 | 16QAM | 1/2 |
| 8 | 256QAM | 3/4 | 1001 | 16QAM | 1/2 | 3 | 16QAM | 1/2 |
| 9 | 256QAM | 5/6 | 1001 | 16QAM | 1/2 | 3 | 16QAM | 1/2 |
| 10 | 1024QAM | 3/4 | 1001 | 16QAM | 1/2 | 3 | 16QAM | 1/2 |
| 11 | 1024QAM | 5/6 | 1001 | 16QAM | 1/2 | 3 | 16QAM | 1/2 |
| 12 | 4096QAM | 3/4 | 1001 | 16QAM | 1/2 | 3 | 16QAM | 1/2 |
| 13 | 4096QAM | 5/6 | 1001 | 16QAM | 1/2 | 3 | 16QAM | 1/2 |

1500

| MCS in data packet | | MCS | MCS in feedback (11a) | | MCS | MCS in feedback (11n) | | MCS | MCS in feedback (11ac) | | MCS | MCS in feedback (11ax) | | MCS | MCS in feedback (11be) | |
|---|---|---|---|---|---|---|---|---|---|---|---|---|---|---|---|---|
| MCS | QAM | code rate | MCS | QAM | code rate | MCS | QAM | code rate | MCS | QAM | code rate | MCS | QAM | code rate | MCS | QAM | code rate |
| 0 | BPSK | 1/2 | 1101 | BPSK | 1/2 | 0 | BPSK | 1/2 | 0 | BPSK | 1/2 | 0 | BPSK | 1/2 | 0 | BPSK | 1/2 |
| 1 | QPSK | 1/2 | 1111 | BPSK | 3/4 | 0 | BPSK | 1/2 | 0 | BPSK | 1/2 | 0 | BPSK | 1/2 | 0 | BPSK | 1/2 |
| 2 | QPSK | 3/4 | 0101 | QPSK | 1/2 | 1 | QPSK | 1/2 | 1 | QPSK | 1/2 | 1 | QPSK | 1/2 | 1 | QPSK | 1/2 |
| 3 | 16QAM | 1/2 | 0111 | QPSK | 3/4 | 2 | QPSK | 3/4 | 2 | QPSK | 3/4 | 2 | QPSK | 3/4 | 2 | QPSK | 3/4 |
| 4 | 16QAM | 3/4 | 1001 | 16QAM | 1/2 | 3 | 16QAM | 1/2 | 3 | 16QAM | 1/2 | 3 | 16QAM | 1/2 | 3 | 16QAM | 1/2 |
| 5 | 64QAM | 2/3 | 1011 | 16QAM | 3/4 | 4 | 16QAM | 3/4 | 4 | 16QAM | 3/4 | 4 | 16QAM | 3/4 | 4 | 16QAM | 3/4 |
| 6 | 64QAM | 3/4 | 0001 | 64QAM | 2/3 | 5 | 64QAM | 2/3 | 5 | 64QAM | 2/3 | 5 | 64QAM | 2/3 | 5 | 64QAM | 2/3 |
| 7 | 64QAM | 5/6 | 0011 | 64QAM | 3/4 | 6 | 64QAM | 3/4 | 6 | 64QAM | 3/4 | 6 | 64QAM | 3/4 | 6 | 64QAM | 3/4 |
| 8 | 256QAM | 3/4 | 0011 | 64QAM | 3/4 | 7 | 64QAM | 5/6 | 7 | 64QAM | 5/6 | 7 | 64QAM | 5/6 | 7 | 64QAM | 5/6 |
| 9 | 256QAM | 5/6 | 0011 | 64QAM | 3/4 | 7 | 64QAM | 5/6 | 8 | 256QAM | 3/4 | 8 | 256QAM | 3/4 | 8 | 256QAM | 3/4 |
| 10 | 1024QAM | 3/4 | 0011 | 64QAM | 3/4 | 7 | 64QAM | 5/6 | 9 | 256QAM | 5/6 | 9 | 256QAM | 5/6 | 9 | 256QAM | 5/6 |
| 11 | 1024QAM | 5/6 | 0011 | 64QAM | 3/4 | 7 | 64QAM | 5/6 | 9 | 256QAM | 5/6 | 10 | 1024QAM | 3/4 | 10 | 1024QAM | 3/4 |
| 12 | 4096QAM | 3/4 | 0011 | 64QAM | 3/4 | 7 | 64QAM | 5/6 | 9 | 256QAM | 5/6 | 11 | 1024QAM | 5/6 | 11 | 1024QAM | 5/6 |
| 13 | 4096QAM | 5/6 | 0011 | 64QAM | 3/4 | 7 | 64QAM | 5/6 | 9 | 256QAM | 5/6 | 11 | 1024QAM | 5/6 | 12 | 4096QAM | 3/4 |

| MCS | QAM | code rate | HE20, LDPC, DNLoS, ZF | HE80, LDPC, DNLoS, ZF | min |
|---|---|---|---|---|---|
| 0 | BPSK | 1/2 | MCS0 | MCS0 | MCS0 |
| 1 | QPSK | 1/2 | MCS0 | MCS0 | MCS0 |
| 2 | QPSK | 3/4 | MCS0 | MCS1 | MCS0 |
| 3 | 16QAM | 1/2 | MCS0 | MCS1 | MCS0 |
| 4 | 16QAM | 3/4 | MCS3 | MCS3 | MCS3 |
| 5 | 64QAM | 2/3 | MCS3 | MCS3 | MCS3 |
| 6 | 64QAM | 3/4 | MCS5 | MCS3 | MCS3 |
| 7 | 64QAM | 5/6 | MCS5 | MCS6 | MCS5 |
| 8 | 256QAM | 3/4 | MCS7 | MCS6 | MCS6 |
| 9 | 256QAM | 5/6 | MCS7 | MCS8 | MCS7 |
| 10 | 1024QAM | 3/4 | MCS8 | MCS9 | MCS8 |
| 11 | 1024QAM | 5/6 | MCS10 | MCS10 | MCS10 |
| 12 | 4096QAM | 3/4 | No result | No result | *MCS11* |
| 13 | 4096QAM | 5/6 | No result | No result | *MCS12* |

FIGURE 17

| MCS in data packet | | | MCS in feedback (11a) | | | MCS in feedback (11n) | | | MCS in feedback (11ac) | | | MCS in feedback (11ax) | | | MCS in feedback (11be) | | |
|---|---|---|---|---|---|---|---|---|---|---|---|---|---|---|---|---|---|
| MCS | QAM | code rate | MCS | QAM | code rate | MCS | QAM | code rate | MCS | QAM | code rate | MCS | QAM | code rate | MCS | QAM | code rate |
| 0 | BPSK | 1/2 | 1101 | BPSK | 1/2 | 0 | BPSK | 1/2 | 0 | BPSK | 1/2 | 0 | BPSK | 1/2 | 0 | BPSK | 1/2 |
| 1 | QPSK | 1/2 | 1101 | BPSK | 1/2 | 0 | BPSK | 1/2 | 0 | BPSK | 1/2 | 0 | BPSK | 1/2 | 0 | BPSK | 1/2 |
| 2 | QPSK | 3/4 | 1101 | BPSK | 1/2 | 0 | BPSK | 1/2 | 0 | BPSK | 1/2 | 0 | BPSK | 1/2 | 0 | BPSK | 1/2 |
| 3 | 16QAM | 1/2 | 1001 | 16QAM | 1/2 | 3 | 16QAM | 1/2 | 3 | 16QAM | 1/2 | 3 | 16QAM | 1/2 | 3 | 16QAM | 1/2 |
| 4 | 16QAM | 3/4 | 1001 | 16QAM | 1/2 | 3 | 16QAM | 1/2 | 3 | 16QAM | 1/2 | 3 | 16QAM | 1/2 | 3 | 16QAM | 1/2 |
| 5 | 64QAM | 2/3 | 1001 | 16QAM | 1/2 | 3 | 16QAM | 1/2 | 3 | 16QAM | 1/2 | 3 | 16QAM | 1/2 | 3 | 16QAM | 1/2 |
| 6 | 64QAM | 3/4 | 0001 | 64QAM | 2/3 | 5 | 64QAM | 2/3 | 5 | 64QAM | 2/3 | 5 | 64QAM | 2/3 | 5 | 64QAM | 2/3 |
| 7 | 64QAM | 5/6 | 0011 | 64QAM | 3/4 | 6 | 64QAM | 3/4 | 6 | 64QAM | 3/4 | 6 | 64QAM | 3/4 | 6 | 64QAM | 3/4 |
| 8 | 256QAM | 3/4 | 0011 | 64QAM | 3/4 | 7 | 64QAM | 5/6 | 7 | 64QAM | 5/6 | 7 | 64QAM | 5/6 | 7 | 64QAM | 5/6 |
| 9 | 256QAM | 5/6 | 0011 | 64QAM | 3/4 | 7 | 64QAM | 5/6 | 8 | 256QAM | 3/4 | 8 | 256QAM | 3/4 | 8 | 256QAM | 3/4 |
| 10 | 1024QAM | 3/4 | 0011 | 64QAM | 3/4 | 7 | 64QAM | 5/6 | 9 | 256QAM | 5/6 | 10 | 1024QAM | 3/4 | 10 | 1024QAM | 3/4 |
| 11 | 1024QAM | 5/6 | 0011 | 64QAM | 3/4 | 7 | 64QAM | 5/6 | 9 | 256QAM | 5/6 | 11 | 1024QAM | 5/6 | 11 | 1024QAM | 5/6 |
| 12 | 4096QAM | 3/4 | 0011 | 64QAM | 3/4 | 7 | 64QAM | 5/6 | 9 | 256QAM | 5/6 | 11 | 1024QAM | 5/6 | 12 | 4096QAM | 3/4 |
| 13 | 4096QAM | 5/6 | 0011 | 64QAM | 3/4 | 7 | 64QAM | 5/6 | 9 | 256QAM | 5/6 | 11 | 1024QAM | 5/6 | 12 | 4096QAM | 3/4 |

| MCS | QAM | n_bpscc | code rate | 8 bits | 16 bits | 24 bits | 32 bits | 40 bits | 48 bits | 56 bits | 64 bits | 128 bits | 256 bits | 512 bits | 1024 bits |
|---|---|---|---|---|---|---|---|---|---|---|---|---|---|---|---|
| 0 | BPSK | 1 | 1/2 | 92 | 96 | 96 | 96 | 100 | 100 | 100 | 104 | 112 | 136 | 176 | 264 |
| 1 | QPSK | 2 | 1/2 | 72 | 76 | 76 | 76 | 76 | 76 | 76 | 80 | 84 | 96 | 116 | 160 |
| 2 | QPSK | 2 | 3/4 | 68 | 68 | 68 | 68 | 68 | 68 | 68 | 72 | 72 | 80 | 96 | 124 |
| 3 | 16QAM | 4 | 1/2 | 64 | 64 | 64 | 64 | 64 | 64 | 64 | 68 | 68 | 76 | 84 | 108 |
| 4 | 16QAM | 4 | 3/4 | 60 | 60 | 60 | 60 | 60 | 60 | 60 | 64 | 64 | 68 | 76 | 88 |
| 5 | 64QAM | 6 | 2/3 | 60 | 60 | 60 | 60 | 60 | 60 | 60 | 60 | 60 | 64 | 68 | 80 |
| 6 | 64QAM | 6 | 3/4 | 60 | 60 | 60 | 60 | 60 | 60 | 60 | 60 | 60 | 64 | 68 | 76 |
| 7 | 64QAM | 6 | 5/6 | 56 | 60 | 60 | 60 | 60 | 60 | 60 | 60 | 60 | 64 | 68 | 76 |

| | ACK | BlockACK (64 MPDUs=8 bytes) | BlockACK (256 MPDUs=32 bytes) | BlockACK (1024 MPDUs=128 bytes) |
|---|---|---|---|---|
| MCS0 | 24us=6sym=18 bytes | 48us=12sym=36 bytes | 80us=20sym=60 bytes | 208us=52sym=156 bytes |
| MCS1 | 12us=3sym=18 bytes | 24us=6sym=36 bytes | 40us=10sym=60 bytes | 104us=26sym=156 bytes |
| MCS3 | 8us=2sym=24 bytes | 12us=3sym=36 bytes | 20us=5sym=60 bytes | 52us=13sym=156 bytes |

2020

| | ACK | | BlockACK (64 MPDUs=8 bytes) | | BlockACK (256 MPDUs=32 bytes) | | BlockACK (1024 MPDUs=128 bytes) | |
|---|---|---|---|---|---|---|---|---|
| | ACK Packet | Plus 2 SIFSs | ACK Packet | Plus 2 SIFSs | ACK Packet | Plus 2 SIFSs | ACK Packet | Plus 2 SIFSs |
| MCS0 | 44us | 76us | 68us | 100us | 100us | 132us | 228us | 260us |
| MCS1 | 32us | 64us | 44us | 76us | 60us | 92us | 124us | 156us |
| MCS3 | 28us | 60us | 32us | 64us | 40us | 72us | 72us | 104us |

FIGURE 20

HYBRID AUTOMATIC REPEAT REQUEST (HARQ) IN A WIRELESS LOCAL AREA NETWORK (WLAN)

CROSS-REFERENCE TO RELATED APPLICATIONS

This patent application claims priority to U.S. Provisional Patent Application No. 62/717,218 filed Aug. 10, 2018, to U.S. Provisional Patent Application No. 62/758,508 filed Nov. 9, 2018 and to U.S. Provisional Patent Application No. 62/792,896 filed Jan. 15, 2019, all of which are entitled "HYBRID AUTOMATIC REPEAT REQUEST (HARQ) IN A WIRELESS LOCAL AREA NETWORK (WLAN)" and assigned to the assignee hereof. The disclosure of the prior applications are considered part of and are incorporated by reference in this patent application.

TECHNICAL FIELD

This disclosure relates to the field of wireless communication, and more particularly to implementing a hybrid automatic repeat request (HARQ) feature in a wireless local area network (WLAN).

DESCRIPTION OF THE RELATED TECHNOLOGY

A wireless local area network (WLAN) may be formed by two or more WLAN devices (which may be referred to as stations, STAs) that share a wireless communication medium using common service settings. One or more of the WLAN devices (which may be referred to as an access point, AP) may establish the common service settings. An AP is a type of STA that performs a distribution system access function in the WLAN. The basic building block of a WLAN conforming to the Institute of Electrical and Electronics Engineers (IEEE) 802.11 family of standards is a Basic Service Set (BSS), which is managed by an AP. Each BSS is identified by a service set identifier (SSID) that is advertised by the AP. An AP periodically broadcasts beacon frames to enable other STAs within wireless range of the AP to establish or maintain a communication link with the WLAN.

A wireless communication between two WLAN devices (which may be referred to as a sending STA and a receiving STA) may be susceptible to interference or other challenges which impair the wireless communication medium. A wireless transmission from a sending STA may include error checking and redundancy information that enables a receiving STA to discover or correct errors in the wireless transmission. If the errors cannot be corrected, the receiving STA may request the data to be retransmitted by the sending STA. For example, the receiving STA may send a feedback message (including an acknowledgment or negative acknowledgment) to indicate whether the data was successfully received. The receiving STA and the sending STA may utilize a first retransmission protocol implemented in the WLAN. However, it may be desirable to support additional retransmission protocols. For example, hybrid automatic repeat request (HARQ) is a retransmission protocol that may not previously have been supported by WLAN devices.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method performed by a first wireless local area network (WLAN) device for implementing a hybrid automatic repeat request (HARQ) protocol. The method may include communicating at least a first packet using a first HARQ transmission from the first WLAN device to a second WLAN device. The method may include determining whether to communicate the first packet in a second HARQ transmission to the second WLAN device based, at least in part, on a first feedback message from the second WLAN device, the first feedback message for acknowledging the first HARQ transmission.

Another innovative aspect of the subject matter described in this disclosure can be implemented in a first WLAN device. In some implementations, the first WLAN device includes a modem, a processor communicatively coupled with the modem, and memory coupled with the processor. The memory may have instructions stored therein which, when executed by the processor, cause the first WLAN device to perform features of the above method.

Another innovative aspect of the subject matter described in this disclosure can be implemented in a computer-readable medium having stored therein instructions which, when executed by a processor of a first WLAN device, causes the first WLAN device to perform features of the above method.

In some implementations, the methods, first WLAN device and computer-readable media may be configured to determine whether the first feedback message is received from the second WLAN device. In some implementations, the methods, first WLAN device and computer-readable media may be configured to, on receiving the first feedback message: determine a type of the first feedback message, where the type is a HARQ feedback type or a non-HARQ feedback type, and determine whether to communicate the first packet in a second HARQ transmission to the second WLAN device based, at least in part, on the type of the first feedback message.

In some implementations, the methods, first WLAN device and computer-readable media may be configured to determine that the type of the first feedback message is the non-HARQ feedback type and terminate a HARQ process between the first WLAN device and the second WLAN device in response to the determination that the type of the first feedback message is the non-HARQ feedback type.

In some implementations, the methods, first WLAN device and computer-readable media may be configured to refrain from communicating the second HARQ transmission if the first feedback message indicates a positive acknowledgment of the first HARQ transmission. In some implementations, the methods, first WLAN device and computer-readable media may be configured to communicate the second HARQ transmission if the first feedback message indicates a negative acknowledgment for at least part of the first HARQ transmission.

In some implementations, the first feedback message includes a single bit to request the second HARQ transmission as a full retransmission of the first HARQ transmission.

In some implementations, the first HARQ transmission is communicated using a first modulation and coding scheme (MCS). In some implementations, the methods, first WLAN device and computer-readable media may be configured to determine a second MCS to use for the second HARQ transmission based, at least in part on an MCS indicator or channel quality information in the first feedback message. In some implementations, the methods, first WLAN device and computer-readable media may be configured to communicate the second HARQ transmission using the second MCS.

In some implementations, the channel quality information includes at least of an MCS rejection, channel quality indicators, or signal-to-noise ratios.

In some implementations, the first HARQ transmission is communicated using a first MCS, and the first feedback message is received using a second MCS different from the first MCS.

In some implementations, the first feedback message includes a bitmap to indicate which portions of the first HARQ transmission were not successfully decoded by the second WLAN device. The second HARQ transmission may include a partial retransmission of the first HARQ transmission, the partial retransmission including retransmitted portions of the first HARQ transmission based, at least in part, on the bitmap.

In some implementations, the bitmap includes a plurality of bits associated with corresponding portions of the first HARQ transmission, where each portion represents a segment, a code block, a group of code blocks, a time segment, a packet, or a group of packets.

In some implementations, the bitmap includes a plurality of bits associated with corresponding one or more sub-bands.

In some implementations, the first feedback message indicates channel quality indicators associated with one or more sub-bands used in the transmission of the first HARQ transmission. In some implementations, the methods, first WLAN device and computer-readable media may be configured to determine failed portions of the first HARQ transmission to retransmit based, at least in part, on the channel quality indicators associated with the one or more sub-bands. In some implementations, the methods, first WLAN device and computer-readable media may be configured to communicate the second HARQ transmission as a partial retransmission of the first HARQ transmission, where the second HARQ transmission includes the failed portions.

In some implementations, the retransmitted data is included in different sub-bands in the second HARQ transmission.

In some implementations, the second HARQ transmission is communicated on different sub-bands than were used for the transmission of the first HARQ transmission.

In some implementations, the methods, first WLAN device and computer-readable media may be configured to determine a maximum quantity of HARQ transmissions for the WLAN. In some implementations, the methods, first WLAN device and computer-readable media may be configured to terminate a HARQ process between the first WLAN device and the second WLAN device if the first packet has been retransmitted using the maximum quantity of HARQ transmissions.

In some implementations, a header of the first HARQ transmissions includes a HARQ indicator for indicating that the first HARQ transmission is formatted according to the HARQ protocol.

In some implementations, the first HARQ transmission includes a least a second packet intended for a third WLAN device, and where the first HARQ transmission is communicated to the second WLAN device and the third WLAN device.

In some implementations, the methods, first WLAN device and computer-readable media may be configured to, prior to communicating the first HARQ transmission, prepare a plurality of encoded bits associated with the first HARQ transmission. In some implementations, the methods, first WLAN device and computer-readable media may be configured to buffer the plurality of encoded bits in a HARQ buffer and map the plurality of encoded bits using a first mapping for the first HARQ transmission. The first mapping may be associated with a member of a group consisting of a constellation mapper, a binary convolutional encoding (BCC) interleaver, and a low-density parity check (LDPC) mapper.

In some implementations, the methods, first WLAN device and computer-readable media may be configured to retrieve the plurality of encoded bits from the HARQ buffer and map the plurality of encoded bits using a second mapping for the second HARQ transmission.

In some implementations, the first HARQ transmission includes data and a first set of parity bits associated with the data. In some implementations, the methods, first WLAN device and computer-readable media may be configured to communicate the second HARQ transmission using incremental redundancy. The second HARQ transmission may include a second set of parity bits associated with the data.

In some implementations, the methods, first WLAN device and computer-readable media may be configured to communicate a first HARQ protocol capability indicator to the second WLAN device to inform the second WLAN device that the first WLAN device is capable of communicating the second HARQ transmission in accordance with the HARQ protocol. The first HARQ protocol capability indicator may be signaled in one or an association message, a configuration message for the HARQ protocol, or a header of the first HARQ transmission.

In some implementations, the methods, first WLAN device and computer-readable media may be configured to receive a second HARQ protocol capability indicator from the second WLAN device indicating that the second WLAN device supports the HARQ protocol. The second HARQ protocol capability may be signaled in one of an association message, a configuration message for the HARQ protocol or a header of the first feedback message.

In some implementations, the first HARQ transmission includes capability information regarding the HARQ protocol. The capability information may include a HARQ enabled indicator, a type of HARQ, a log likelihood ration (LLR) buffer size, a modulation and coding scheme (MCS) setting, a puncturing parameter, an acknowledgement type, or a scrambling seed.

In some implementations, the methods, first WLAN device and computer-readable media may be configured to communicate the second HARQ transmission in an aggregated media access control (MAC) protocol data unit (A-MPDU), where the A-MPDU includes the second HARQ transmission for the first packet and also includes new data associated with a second packet.

In some implementations, the new data associated with the second packet is encoded as a new first HARQ transmission.

In some implementations, the methods, first WLAN device and computer-readable media may be configured to communicate the second HARQ transmission in an aggregated physical layer protocol data unit (A-PPDU) that aggregates multiple PPDUs. Aa first PPDU may include the second HARQ transmission for the first packet and a second PPDU includes new data associated with a second packet.

In some implementations, the first HARQ transmission includes a plurality of codewords, and where the first feedback message includes codeword-based feedback.

In some implementations, the second HARQ transmission includes portions of the first packet that map to particular sub-bands or codewords based on the codeword-based feedback.

In some implementations, the methods, first WLAN device and computer-readable media may be configured to omit portions of the second HARQ transmission to reduce a duration of the second HARQ transmission. The omitted portions may include omitting an interframe space, a signaling header, or a training field.

Another innovative aspect of the subject matter described in this disclosure can be implemented as a method performed by a second WLAN device for implementing a HARQ protocol. The method may include receiving a first HARQ transmission from a first WLAN device, the first HARQ transmission including at least a first packet for the second WLAN device. The method may include attempting to decode the first HARQ transmission. The method may include determining a type of a first feedback message to send to the first WLAN device based, at least in part, on whether the first HARQ transmission was successfully decoded, where the type is a HARQ feedback type or a non-HARQ feedback type. The method may include sending the first feedback message to the first WLAN device in response to the first HARQ transmission.

Another innovative aspect of the subject matter described in this disclosure can be implemented in a second WLAN device. In some implementations, the second WLAN device includes a processor and memory coupled with the processor. The memory may have instructions stored therein which, when executed by the processor, cause the second WLAN device to perform features of the above methods.

Another innovative aspect of the subject matter described in this disclosure can be implemented in a computer-readable medium having stored therein instructions which, when executed by a processor of a second WLAN device, causes the second WLAN device to perform features of the above methods.

In some implementations, the methods, second WLAN device and computer-readable media may be configured to determine to terminate a HARQ process between the first WLAN device and the second WLAN device. In some implementations, the methods, second WLAN device and computer-readable media may be configured to select the non-HARQ feedback type as the type for the first feedback message.

In some implementations, the methods, second WLAN device and computer-readable media may be configured to determine a low memory condition of the second WLAN device associated with buffering the first HARQ transmission.

In some implementations, the first HARQ transmission may be received using a first modulation and coding scheme (MCS). In some implementations, the methods, second WLAN device and computer-readable media may be configured to determine to request a second MCS for a second HARQ transmission. In some implementations, the methods, second WLAN device and computer-readable media may be configured to include an MCS indicator in the first feedback message, the MCS indicator for requesting the second MCS for the second HARQ transmission.

In some implementations, the second MCS is a lower modulation order MCS than the first MCS.

In some implementations, the first feedback message includes a bitmap to indicate which portions of the first HARQ transmission were not successfully decoded by the second WLAN device.

In some implementations, the bitmap includes a plurality of bits associated with corresponding portions of the first HARQ transmission, where each portion represents a time segment, a sub-band, a code block, a group of code blocks, a packet, or a group of packets.

In some implementations, the methods, second WLAN device and computer-readable media may be configured to include a sub-band indicator in the first feedback message, where the sub-band indicator requests retransmission of one or more sub-bands of the first HARQ transmission. In some implementations, the methods, second WLAN device and computer-readable media may be configured to receive the second HARQ transmission having retransmitted data associated with the one or more sub-bands.

In some implementations, the methods, second WLAN device and computer-readable media may be configured to receive a second HARQ transmission from the first WLAN device, and combine the first HARQ transmission with the second HARQ transmission to recover at least the first packet.

In some implementations, the methods, second WLAN device and computer-readable media may be configured to combine the first HARQ transmission and the second HARQ transmission using log-likelihood ratio (LLR) combining.

Another innovative aspect of the subject matter described in this disclosure can be implemented as a method performed by a first WLAN device for implementing a HARQ protocol. The method may include communicating at least a first packet using a first HARQ transmission from the first WLAN device to a second WLAN device. The method may include determining whether to communicate the first packet in a second HARQ transmission to the second WLAN device based on a first feedback message from the second WLAN device.

Another innovative aspect of the subject matter described in this disclosure can be implemented in a first WLAN device. In some implementations, the first WLAN device includes a processor and memory coupled with the processor. The memory may have instructions stored therein which, when executed by the processor, cause the first WLAN device to perform features of the above method.

Another innovative aspect of the subject matter described in this disclosure can be implemented in a computer-readable medium having stored therein instructions which, when executed by a processor of a first WLAN device, causes the first WLAN device to perform features of the above method.

In some implementations, the methods, first WLAN device and computer-readable media may be configured to communicate a HARQ protocol capability indicator to the second WLAN device to inform the second WLAN device that the first WLAN device is capable of communicating the second HARQ transmission in accordance with the HARQ protocol.

In some implementations, the HARQ protocol capability indicator may be included in a header of the first HARQ transmission.

In some implementations, the HARQ protocol capability indicator may be included in an initialization message for the HARQ protocol.

In some implementations, the first HARQ transmission may include capability information regarding the HARQ protocol.

In some implementations, the capability information includes at least one member selected from a group consisting of a HARQ enabled indicator, a type of HARQ, a log likelihood ration (LLR) buffer size, a modulation and coding scheme (MCS) setting, a puncturing parameter, an acknowledgement type, and a scrambling seed.

In some implementations, the first HARQ transmission may include an indicator based on a log likelihood ration (LLR) buffer size that represents a number of coded bits that may be stored for the HARQ process.

In some implementations, the methods, first WLAN device and computer-readable media may be configured to communicate the second HARQ transmission in an aggregated media access control (MAC) protocol data unit (A-MPDU). The A-MPDU includes the second HARQ transmission for the first packet and also includes new data associated with a second packet.

In some implementations, the data associated with the second packet may be encoded as a new first HARQ transmission the new data.

In some implementations, the methods, first WLAN device and computer-readable media may be configured to communicate the second HARQ transmission in an aggregated physical layer protocol data unit (A-PPDU) that aggregates multiple PPDUs. A first PPDU may include the second HARQ transmission for the first packet and a second PPDU may include new data associated with a second packet.

In some implementations, the methods, first WLAN device and computer-readable media may be configured to use a same scrambling state for the first packet in the first HARQ transmission and in the second HARQ transmission.

In some implementations, the methods, first WLAN device and computer-readable media may be configured to communicate a scrambling seed in the first HARQ transmission.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 14 includes a table showing examples how a log-likelihood ratio (LLR) and buffer size may be used with a HARQ protocol.

FIG. 16 shows another table with example MCS options based on lower max MCS rules.

FIG. 17 shows another table with example MCS options based on reliability.

FIG. 18 shows another table with example MCS options based on reliability.

FIG. 19 shows a table with example feedback durations that may be determined based on MCS and block ack bitmap size.

FIG. 20 shows tables with feedback duration using a legacy communication protocol and various MCSs.

Like reference numbers and designations in the various drawings indicate like elements.

DETAILED DESCRIPTION

Figure 1:
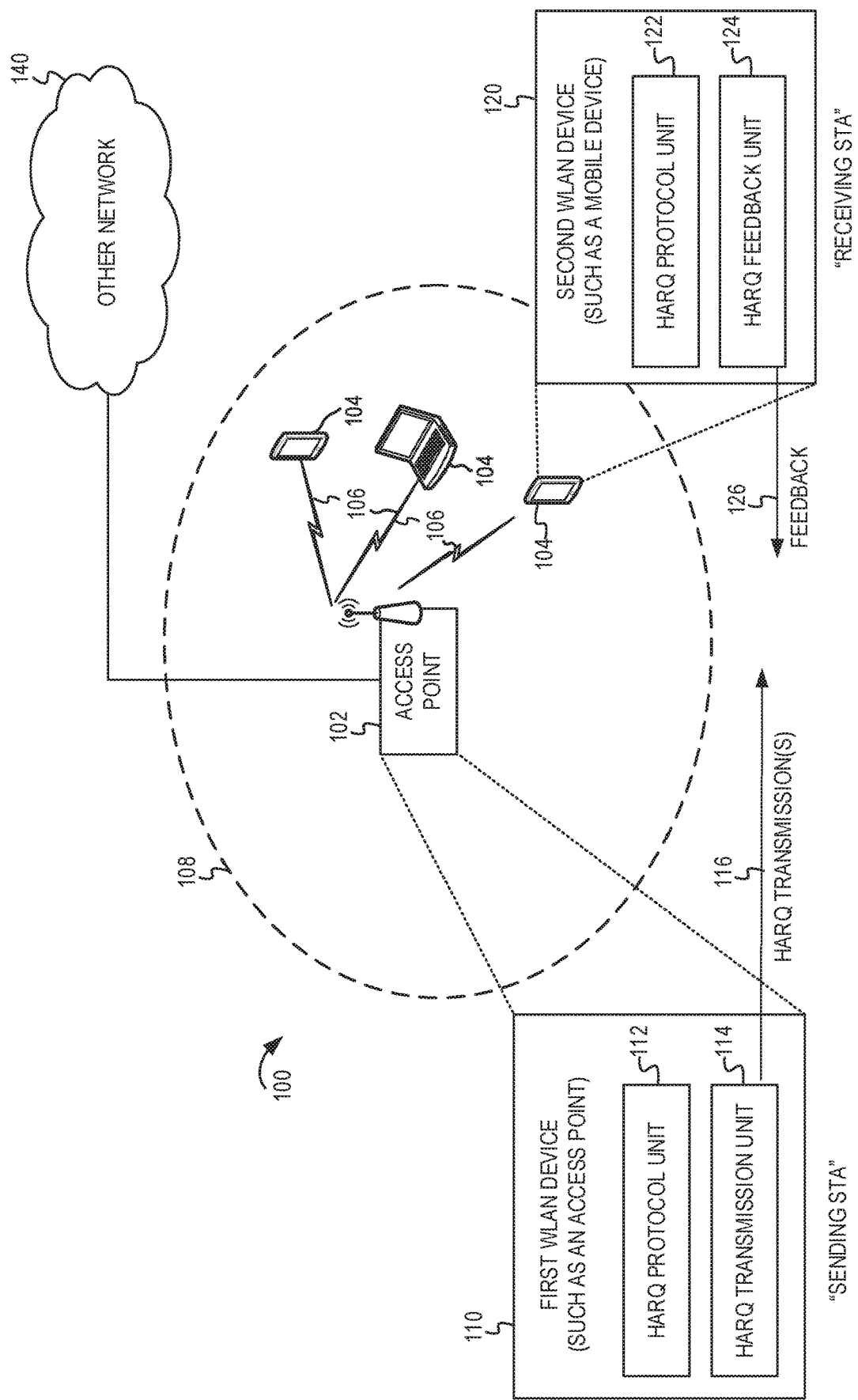
FIG. 1 depicts a system diagram of an example wireless local area network (WLAN).

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless local area network (WLAN) communication according to the Institute of Electrical and Electronics Engineers (IEEE) 802.11 wireless standards. However, the described implementations may be implemented in any device, system or network that is capable of transmitting and receiving radio frequency (RF) signals according to one or more of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

A wireless local area network (WLAN) in a home, apartment, business, or other area may include one or more WLAN devices. Each WLAN device may have a station (STA) interface which is addressable entity that shares a wireless communication medium with other STAs. An access point (AP) is a WLAN device that includes a STA interface as well as a distribution system access function. For brevity in this disclosure, WLAN devices may be referred to as STAs, regardless of whether the WLAN device is an AP or a non-AP STA. A first WLAN device (acting as a sending STA) may communicate data to a second WLAN device (acting as a receiving STA) via a wireless channel. Due to the nature of wireless communication, the WLAN devices may implement a retransmission protocol to improve reliable delivery of a media access control (MAC) protocol data unit (MPDU). An MPDU also may be referred to as a packet in some aspects of this disclosure. A physical convergence layer (PHY) protocol data unit (PPDU) may include one or more MPDUs. For example, one type of PPDU (referred to as an Aggregated MPDU, or A-MPDU) may include multiple MPDUs in a payload of the AMPDU. A PPDU also may be referred to as a frame in some aspects of this disclosure.

A traditional retransmission protocol (which may be referred to as a baseline approach) may use a first type of feedback message that includes an acknowledgment (ACK). In some implementations, the absence of an ACK may be interpreted as a negative acknowledgment (NACK). For example, the first type of feedback message may be referred to as a traditional ACK message type. A receiving STA may send a traditional ACK message to the sending STA to indicate whether the receiving STA has successfully received the PPDU. If the sending STA doesn't receive a traditional ACK message (by an expected time) in response to a PPDU, the sending STA may retransmit the original PPDU. In another retransmission protocol, the receiving STA may bundle ACKs or NACKs for multiple MPDUs in a block acknowledgment feedback message. The block acknowledgment feedback message may be referred to as a Block ACK message type. The Block ACK message type may indicate which MPDUs in an A-MPDU have been successfully received. A sending STA may retransmit those MPDUs which are not indicated as being received correctly in the Block ACK feedback message.

Hybrid automatic repeat request (hybrid ARQ or HARQ) is another retransmission protocol. HARQ has previously been used in wide area wireless communication systems. HARQ uses a combination of error detection and error correction. A HARQ transmission may include error checking bits that are added to data to be transmitted using an error-detecting (ED) code such as a cyclic redundancy check (CRC). The error checking bits may be used by a receiving STA to determine if it has properly decoded the received HARQ transmission. Additionally, the HARQ transmission may utilize an error correction technique. For example, the original data may be encoded with a forward error correction (FEC) code. Both original data and parity bits may be sent in the HARQ transmission. A receiving STA may be able to use the parity bits to correct errors in the transmission, thus avoiding a retransmission. The ED code may be omitted when encoding is used that can perform both FEC and ED, such as a Reed-Solomon code. Another feature of HARQ is that a receiving STA may combine a first HARQ transmission with a second HARQ transmission. For example, if the receiving STA cannot properly decode (and cannot correct the errors) the first HARQ transmission, the receiving STA may send a HARQ feedback message that indicates at least part of the first HARQ transmission was not properly decoded. The HARQ feedback message is another type of feedback message, different from the traditional ACK/NACK feedback message type and the Block ACK feedback message type. In response to receiving the HARQ feedback message, the sending STA may transmit a second HARQ transmission to the receiving STA to communicate at least part of the first HARQ transmission that was not acknowledged. The receiving STA may combine the second HARQ transmission with the first HARQ transmission so that a total signal can be decoded. The combined HARQ transmissions may be processed for decoding and error correction.

The receiving STA may use different techniques to combine the second HARQ transmission and the first HARQ transmission. Examples of combining the HARQ transmissions include chase combining and incremental redundancy. In chase combining, every HARQ retransmission may contain the same information (data and parity bits). The receiving STA may use maximum-ratio combining to combine the received bits with the same bits from previous HARQ transmissions. The HARQ transmissions may be identical to make the chase combining process more efficient. In incremental redundancy, every HARQ retransmission may contain different information (based on the same source data) than the previous HARQ transmission. Multiple sets of coded bits are generated, each representing the same set of information bits. The HARQ retransmission uses a different set of coded bits than the previous HARQ transmission, with different redundancy versions generated by puncturing the encoder output. Thus, at every HARQ retransmission the Receiving STA gains extra information. In some implementations, chase combining may be less processor intensive than incremental redundancy.

Implementing HARQ in a WLAN may improve reliability of wireless communication. However, because WLAN devices may not have previously implemented HARQ, a WLAN device may not recognize a HARQ transmission or a HARQ feedback message. A HARQ protocol for use in a WLAN may involve some changes to a traditional HARQ concept as well as some changes to WLAN retransmission concepts and types of signaling.

This disclosure provides several techniques for using HARQ on a WLAN. The various implementations described in this disclosure may be combined or modified for use with standards-compliant WLAN devices. Some implementations include signaling regarding HARQ capabilities, HARQ transmissions, scrambling or descrambling, and various types of acknowledgements that may be used.

In one aspect of this disclosure, new formats for PPDUs may be defined for HARQ transmissions or HARQ feedback in a WLAN. For example, a first PPDU for a first HARQ transmission may include a signaling header to enable the receiving STA to identify the first PPDU as a first HARQ transmission. The first PPDU may include identifiers of a first WLAN device (as the sending STA) and the second WLAN device (as the receiving STA). In some implementations, the first PPDU may be based on a multi-user (MU) PPDU format defined in IEEE 802.11ax draft standard (which may be referred to as "11ax" for brevity in this description) or IEEE 802.11be draft standard (which may be referred to as "11be" for brevity in this description). The MU PPDU packet format may be modified to support HARQ transmissions to one or more receiving STAs. In some implementations, the MU PPDU format may be modified for use as a HARQ transmission to a single receiving STA identified in a header of the MU PPDU format. In some implementations, the MU PPDU format may be modified, extended, or redefined to support HARQ transmissions with new HARQ features as described in this disclosure. Various signaling options may be included in a first HARQ transmission to enable the transmitting STA and receiving STA to coordinate a HARQ process. For example, a first HARQ transmission may include signaling regarding HARQ capability, scrambling, or other settings related to a HARQ process. In some implementations, a PPDU that is a first HARQ transmission or a second HARQ transmission may include an indication regarding the HARQ process. For example, a second HARQ transmission may include an indication to specify it is the second transmission of the same data. In some implementations, the second HARQ transmission may include a dedicated STA identifier (STA ID) associated with HARQ retransmissions.

In some implementations, the sending STA may determine whether to send a second HARQ transmission based on a type of feedback message received from the receiving STA in response to the first HARQ transmission. For example, if the receiving STA sends a HARQ feedback message, the sending STA may send the second HARQ transmission if the HARQ feedback message indicates a NACK. Alternatively, if the receiving STA sends a non-HARQ feedback message (such as a traditional ACK/NACK message or a Block ACK message), the sending STA may refrain from sending the second HARQ transmission. The non-HARQ feedback message may be used to acknowledge the first HARQ transmission or may be used to terminate the HARQ process. For example, if the receiving STA determines a low memory condition associated with buffering the first HARQ transmission, the receiving STA may determine that HARQ combination would be inefficient. If so, the receiving STA may terminate the HARQ process by sending a non-HARQ feedback message in response to the first HARQ transmission. Alternatively, if the receiving STA has successfully received all or most of the MPDUs in the first HARQ transmission, the receiving STA may determine that the channel conditions support reliable communication without the overhead associated with HARQ error correction coding. If so, the receiving STA may send a non-HARQ feedback message to cause the sending STA to use non-HARQ message format for a subsequent transmission of new data. In some implementations, the receiving STA may send a HARQ feedback message indicating ACK so that the sending STA will continue to use the HARQ process to send new data in a new first HARQ transmission.

This disclosure includes several types of HARQ feedback messages and related signaling which may be used. For example, in different implementations, the HARQ feedback message may be PHY layer or a MAC layer feedback message adapted for use with the HARQ process. Several techniques are described for a receiving STA to indicate which portions of the original transmission were not properly received. For example, a Block ACK feedback message may identify MPDUs from the original transmission that were not properly decoded. In another example, a PHY layer Block ACK feedback message may identify time segments, or code blocks, or groups of code blocks, from the original transmission that were not properly decoded (such as due to CRC check failure, or LDPC parity check failure). For example, the HARQ retransmission may be a partial retransmission of the forward error correction (FEC) encoded data based on the portions of the first HARQ transmission that were not properly decoded.

In some implementations, the sending STA may use a different modulation and coding scheme (MCS) for a second HARQ transmission than what was used in a previous first HARQ transmission. For example, the HARQ feedback message from the receiving STA may indicate or suggest the different MCS in the subsequent HARQ transmission. Although the same data may be retransmitted in the second HARQ transmission, the different MCS may improve reliability of the second HARQ transmission. The MCS may be a different order of modulation. For example, the first HARQ transmission may use a 16-quadratrue amplitude modulation (16-QAM) MCS, while the second HARQ transmission may use a quadrature phase shift keyed (QPSK) MCS. A person having ordinary skill in the art will readily recognize that other modulation schemes can be used depending on the design constraints of the system.

In some implementations, the WLAN devices may be capable of changing the interleaving and constellation mapping used for a second HARQ transmission compared to a first HARQ transmission. For example, the sending STA may buffer encoded bits from the first HARQ transmission. The first HARQ transmission may be prepared using a constellation mapping, a binary convolutional encoding (BCC) interleaving, or a low-density parity check (LDPC) mapping. When preparing the second HARQ transmission, the buffered encoded bits may be processed using a different constellation mapping, a different BCC interleaving, or a different LDPC mapping than was used for preparing the first HARQ transmission. For example, the second HARQ transmission may use an inverse bit order when mapping the buffered encoded bits (inverse from the bit order used for the first HARQ transmission). Changing the BCC interleaving or LDPC tone mapper may improve diversity for the second HARQ transmission. A receiving STA may reverse the process to realign the bits from the second HARQ transmission before combining them with the original bits of the first HARQ transmission. In some implementations, data bits are scrambled (using a scrambler) before encoding using a BCC or LDPC encoder. This disclosure includes some features to improve reliability of data transmission by communicating a scrambling seed or state from a transmitting STA to a receiving STA. A receiving STA may use the scrambling seed or state to reverse the scrambling.

In some implementations, one or more HARQ feedback message types may be defined for use in the WLAN. The HARQ feedback message may cause a full retransmission or may cause a partial retransmission of the first HARQ transmission. This disclosure provides several ways in which a second HARQ transmission may be a partial retransmission of the first HARQ transmission. For example, the second HARQ transmission may include a portion of transmitted data that was included in the first HARQ transmission. The retransmitted portion may be requested by a receiving STA in a HARQ feedback message. For example, the HARQ feedback message may request retransmission of particular time segments, sub-bands, code blocks, groups of code blocks, MPDU or groups of MPDUs. In some implementations, the H-ACK/NACK may be used for indicating NACK, while a traditional ACK may be used for indicating ACK.

A first example HARQ feedback message type may be referred to as a short HARQ ACK/NACK (or short H-ACK/NACK) message. The short H-ACK/NACK may include dedicated values for a length or rate field of a legacy short PPDU frame format to indicate ACK or NACK. The short H-ACK/NACK may include an approximately 20 microsecond ($\mu$s) legacy preamble without a data payload. Using dedicated values for the fields of a legacy preamble may enable HARQ feedback while reducing overhead. The dedicated values can be specified such that the short H-ACK/

NACK can cause a full retransmission of the first HARQ transmission (as a second HARQ transmission) using the same MCS. Alternatively, the short H-ACK/NACK may indicate portions (such as time segments, code block, groups of code blocks, sub-band portions, MPDUs, or groups of MPDUs) of the first HARQ transmission to include in the second HARQ transmission for a partial retransmission. The short H-ACK/ACK also may request or suggest a change to the MCS for the second HARQ transmission. A second example HARQ feedback message may be referred to as a long H-ACK/NACK. The long H-ACK/NACK may use a data payload to carry HARQ feedback bits. For example, the feedback bits may include ACK or NACK for segments of the first HARQ transmission and may indicate MCS for the HARQ retransmission. A third example HARQ feedback message may be based on the Block ACK message type with a change to indicate that the Block ACK message is a HARQ feedback message. Another example HARQ feedback message may be based on a MAC layer acknowledgement message that is adapted for us in the HARQ process.

In some implementations, a HARQ feedback message may indicate a frequency sub-band for the second HARQ transmission. For example, a long H-ACK/NACK may include an indicator to indicate which sub-bands of the first HARQ transmission should be retransmitted in the second HARQ transmission. The sub-bands may be represented as resource units (RUs) of an orthogonal frequency division multiplexing (OFDM) symbol. The sub-bands may be indicated using a bitmap with bits to represent different sub-bands of the first HARQ transmission. In some implementations, the second WLAN device may retransmit the data associated with the requested sub-bands when communicating the second HARQ transmission. In some implementations, the retransmitted data may be in different sub-bands of the second HARQ transmission than where it was located in the first HARQ transmission.

In some implementations, the HARQ protocol may be based on channel quality between the transmitting STA and the receiving STA. For example, the HARQ feedback may include channel quality indicators (which may be referred to as CQI feedback). The transmitting STA may signal a CQI feedback request in the first HARQ transmission to cause the receiving STA to send the CQI feedback in the HARQ feedback message. In some implementations, the CQI feedback may be for the whole bandwidth or for partial bandwidth (such as those sub-bandsub-bands or channels indicated in the CQI feedback). If a HARQ feedback message includes sub-band CQI based feedback (or code block group size, i.e., number of codewords per group (CWG) feedback), in some implementations, the transmitting STA may determine whether to retransmit all the data or those sub-bandsub-bands or codewords which were not acknowledged.

In accordance with aspects of this disclosure, the HARQ protocol may support new variations of HARQ for use in a WLAN. For example, the HARQ protocol may include some control frames to initiate a HARQ process between the first WLAN device and the second WLAN device. The control frames may include configuration information for the HARQ process, such as a custom STA ID, MCS settings, number of spatial streams, maximum quantity of HARQ retransmissions to use in the WLAN, or the like. In some implementations, the HARQ protocol may support an incremental redundancy coding technique based on LDPC encoding. In some aspects, HARQ transmissions may be used with orthogonal frequency division multiple access (OFDMA) contention. In a contention-based wireless communication medium (such as OFDMA), the timing of a HARQ feedback message may be less predictable. In some implementations, the wireless communication medium may be reserved for a HARQ feedback message following a HARQ transmission. The HARQ feedback message may be based on a null data packet (NDP) feedback report message type. The NDP feedback report is a mechanism for the sending STA to collect short feedbacks from multiple receiving STAs. The feedbacks are sent without data payloads in response to a Trigger frame. In some NDP feedback messages, each bit (or group of bits) in the NDP short feedback message may represent different segments of the HARQ transmission. In another variation, the NDP feedback message type may be modified for a HARQ feedback message in which each bit associated with a different receiving STA.

Particular implementations of the subject matter described in this disclosure can be implemented to realize one or more of the following potential advantages. Implementing a HARQ protocol in a WLAN may improve reliability of data communicated from a sending STA to a receiving STA. The HARQ protocol may support the establishment of a HARQ session between two WLAN devices. The HARQ protocol may enable the receiving STA to control whether to continue the HARQ process or revert to a non-HARQ retransmission scheme (such as the baseline approach). Furthermore, the HARQ protocol supports a wide variety of new HARQ feedback message types to cause the sending STA to modify one or more aspects of the second HARQ transmission for better reliability or for optimized throughput in the WLAN.

FIG. 1 depicts a system diagram of an example WLAN for introducing concepts of this disclosure. FIG. 1 includes a block diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof, including IEEE 802.11be). The WLAN 100 may include numerous wireless communication devices such as an AP 102 and multiple STAs 104 having wireless associations with the AP 102. The IEEE 802.11-2016 specification defines a STA as an addressable unit. An AP is an entity that contains at least one STA and provides access via a wireless medium (WM) for associated STAs to access a distribution service (such as another network 140). Thus, an AP includes a STA and a distribution system access function (DSAF). In the example of FIG. 1, the AP 102 may be connected to a gateway device (not shown) which provides connectivity to the other network 140. The DSAF of the AP 102 may provide access between the STAs 104 and another network 140. While AP 102 is described as an access point using an infrastructure mode, in some implementations, the AP 102 may be a traditional STA which is operating as an AP. For example, the AP 102 may be a STA capable of operating in a peer-to-peer mode or independent mode. In some other examples, the AP 102 may be a software AP (SoftAP) operating on a computer system.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), wearable devices, music or other audio or stereo devices, remote control devices ("remotes"), printers, kitchen or other household appliances, key fobs (for example, for passive keyless entry and start (PKES) systems), among other possibilities.

The AP 102 and the associated STAs 104 may be referred to as a basic service set (BSS), which is managed by the AP 102. A BSS refers to one STA (such as an AP) that has established service settings and one or more STAs that have successfully synchronized the service settings. Alternatively, a BSS may describe a set of STAs have synchronized matching mesh service profiles. Using the example architecture in FIG. 1, the BSS may be identified by a service set identifier (SSID) that is advertised by the AP 102. The AP 102 may periodically broadcast beacon frames ("beacons") to enable any STAs 104 within wireless range of the AP 102 to establish or maintain a respective communication link 106 (also referred to as a "Wi-Fi link" or "wireless association") with the AP. An "unassociated STA" (not shown) may not be considered part of the BSS because they do not have a wireless session established at the AP 102. The various STAs 104 in the WLAN may be able to communicate with external networks as well as with one another via the AP 102 and respective communication links 106. To establish a communication link 106 with an AP 102, each of the STAs is configured to perform passive or active scanning operations ("scans") on frequency channels in one or more frequency bands (for example, the 2.4 GHz, 5 GHz, 6 GHz or 60 GHz bands). To perform passive scanning, a STA listens for beacons, which are transmitted by respective APs 102 at a periodic time interval referred to as the target beacon transmission time (TBTT) (measured in time units (TUs) where one TU is equal to 1024 microseconds (s)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link with the selected AP.

FIG. 1 additionally shows an example coverage area 108 of the AP 102, which may represent a basic service area (BSA) of the WLAN 100. While one AP 102 is shown in FIG. 1, the WLAN 100 can include multiple APs 102. As a result of the increasing ubiquity of wireless networks, a STA 104 may have the opportunity to select one of many BSSs within range of the STA 104 or select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP with which to associate. For example, a STA 104 that is moving relative to its associated AP 102 may perform a "roaming" scan to find another AP having more desirable network characteristics such as a greater received signal strength indicator (RSSI).

The APs 102 and STAs 104 may function and communicate (via the respective communication links 106) according to the IEEE 802.11 family of standards (such as that defined by the IEEE 802.11-2016 specification or amendments thereof including, but not limited to, 802.11aa, 802.11ah, 802.11aq, 802.11ay, 802.11ax, 802.11be, 802.11az, and 802.11ba). These standards define the WLAN radio and baseband protocols for the physical (PHY) and medium access control (MAC) layers. The APs 102 and STAs 104 transmit and receive frames (hereinafter also referred to as wireless communications") to and from one another in the form of physical layer convergence protocol (PLCP) protocol data units (PPDUs. Each PPDU is a composite frame that includes a PLCP preamble and header as well as one or more MAC protocol data units (MPDUs).

The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be Extreme High Throughput (EHT) standard amendments may be transmitted over the 2.4, 5 GHz and 6 GHz bands, each of which may be divided into multiple 20 MHz channels (or larger). As such, these PPDUs are transmitted over a physical channel having a minimum bandwidth based on the channel size. But larger channels can be formed through channel bonding. For example, PPDUs conforming to the IEEE 802.11n, 802.11ac, 802.11ax, and 802.11be standard amendments may be transmitted over physical channels having bandwidths of 40 MHz, 80 MHz or 160 MHz by bonding together two or more 20 MHz channels. For example, IEEE 802.11n described the use of 2 channels (for a combined 40 MHz bandwidth) and defined a High Throughput (HT) transmission format. IEEE 802.11ac described the use of 8 channels (for a combined 160 MHz bandwidth) and defined a Very High Throughput (VHT) transmission format. IEEE 802.11ax also supports a combined 160 MHz bandwidth (which is a combination of 8 channels of 20 MHz width each). For brevity, this disclosure includes descriptions of IEEE 802.11ax devices as an example. In IEEE 802.11ax, a transmission format may spread High Efficiency (HE) modulated symbols throughout a combined channel group.

The AP 102 may be an example of a first WLAN device 110. Regardless of whether the first WLAN device 110 is an AP or a traditional STA, it may be referred to as a "sending STA" for the example HARQ processes in this disclosure. The STAs 104 may be examples of the second WLAN device 120 and may be referred to as a "receiving STA" in the example HARQ processes in this disclosure. To be clear, the designations of sending STA and receiving STA may be reversed in other example HARQ processes. In the example HARQ processes, the first WLAN device 110 may send HARQ transmissions 116 to the second WLAN device 120 and the second WLAN device 120 may respond with feedback 126. The example HARQ process and feedback options are described in FIG. 2.

The first WLAN device 110 (as sending STA) may include a HARQ protocol unit 112 and a HARQ transmission unit 114. The HARQ protocol unit 112 may implement a HARQ protocol in accordance with aspects of this disclosure. The HARQ transmission unit 114 may prepare and communicate the HARQ transmissions 116. The second WLAN device 120 (as receiving STA) may include a HARQ protocol unit 122 and a HARQ feedback unit 124. The HARQ protocol unit 122 may implement the HARQ protocol in accordance with aspects of this disclosure. The HARQ feedback unit 124 may prepare and communicate the feedback 126. In some instances, the first WLAN device 110 and the second WLAN device 120 may exchange service discovery frames or other management frames to ascertain whether both devices support the HARQ protocol or particular features of the HARQ protocol. In some implementations, a first HARQ transmission (as an initial transmission) may include signaling to configure the HARQ process.

Figure 2:
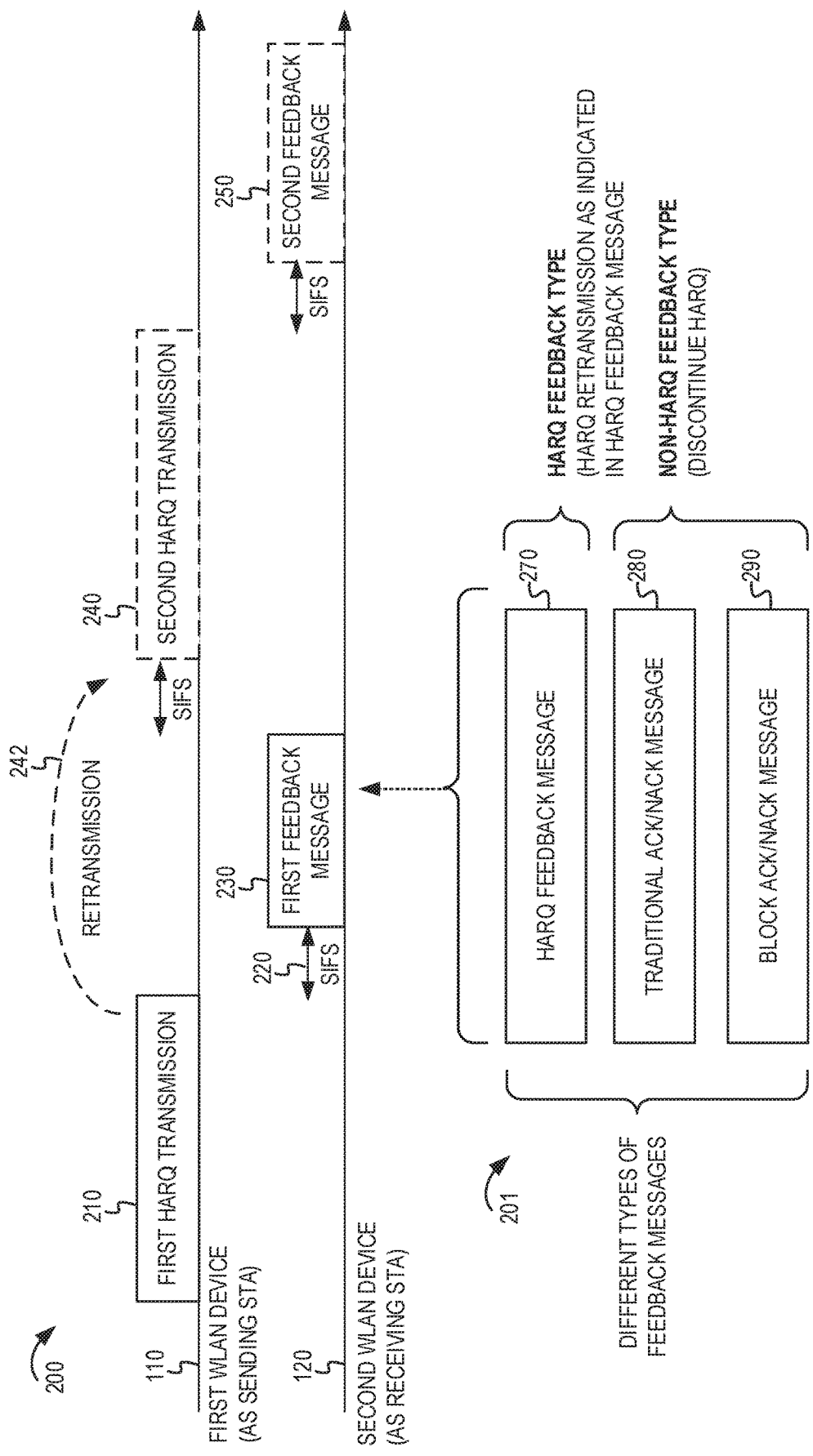
FIG. 2 depicts an example hybrid automatic repeat request (HARQ) retransmission.

FIG. 2 depicts an example HARQ retransmission. A HARQ process 200 may begin with a first HARQ transmission 210 from the first WLAN device 110 to the second WLAN device 120. The first HARQ transmission 210 (sometimes referred to as an initial transmission or initial packet) may be formatted to indicate that the transmission is a HARQ transmission. For example, the first HARQ transmission 210 may be formatted using a HARQ PPDU as described in FIG. 4. In some implementations, a decision whether to send data as a HARQ transmission or a non-HARQ transmission may be made by the sending STA. In the example of FIG. 2, the first WLAN device 110 has sent a first set of data in the first HARQ transmission 210.

This disclosure includes some additional options for signaling that may be included in the first HARQ transmission 210 in some implementations. For example, the signaling may indicate HARQ capability, type of HARQ process, an LLR buffer size, or the like. The signaling included in the first HARQ transmission 210 may depend on whether HARQ is a mandatory or optional feature and how it is defined in a communication protocol. Note that the LLR buffer size here refers to the number of coded bits whose LLRs need be stored. It may not be equivalent to the quantization of LLR (such as the number of bits to represent each LLR value), which may differ based on the designed receiver implementation. Furthermore, the first HARQ transmission 210 may include signaling related to the HARQ process. In some implementations, the first HARQ transmission 210 may include a HARQ capability or enablement indicator, a transmission counter, or both, to indicate that the first HARQ transmission 210 is formatted for use in a HARQ process. In some implementations, the first HARQ transmission 210 may indicate the type of HARQ (such as Chase combining, punctured Chase combining or incremental redundancy), a type of coding (such as BCC, LDPC, or an encoding scheme specific to HARQ), or MCS information regarding the MCS used for part or all of the first HARQ transmission 210. The MCS information may include coding rate, modulation, puncturing ratio (p_ratio) from mother codeword (if LDPC) or coded bits (if BCC) or a puncturing pattern. Puncturing may refer to selection of coded bits ("puncturing" from generated coded bits) to form a HARQ transmission. It can specify what bits to puncture (such as only puncturing parity bits or puncturing both info bits and parity bits) and how to do puncturing (such as puncturing x bit(s) every y bits, or the like). Depending on how LDPC codes are designed for the HARQ process, the MCS information may be similar to the MCS used in other types of transmissions or a redefined MCS associated with HARQ. In some implementations, the first HARQ transmission 210 may include a STA identifier (ID) in a physical layer header of the first HARQ transmission 210 (such as a field in a preamble of an SU PPDU or an MU PPDU). In some implementations, the first HARQ transmission 210 may include a granularity or type of feedback for the second WLAN device 120 to send. For example, the first HARQ transmission 210 may request a PHY or MAC type HARQ ACK with certain granularity such as an MPDU based ACK (based on decoding an MPDU delimiter and a frame check sequence (FCS) field), an LDPC codeword or a group of codewords or time segment based ACK, an entire packet ACK (based on decoding a BCC CRC), among other examples. In some implementations, the first HARQ transmission 210 may indicate a CQI feedback request for the second WLAN device 120 to provide whole bandwidth CQI or sub-band CQI feedback with a particular granularity. In some implementations, the first HARQ transmission 210 may include a scrambling seed to improve reliability of the transmission and for use with the receiver's descrambler.

In some implementations, the first HARQ transmission 210 may be prepared using LDPC encoding. For example, the first HARQ transmission 210 may use existing LDPC codes based on a previous transmission. If so, the mother codes may have longer codewords. Once the code rate R1 and codeword length is determined for the first HARQ transmission 210, the mother code (code rate and parity check matrix may remain fixed for use with a second HARQ transmission. In some implementations, the first HARQ transmission 210 may use a punctured version of mother codewords used with existing LDPC codes. The MCS signaling in the first HARQ transmission 210 (if included) may indicate the modulation used in first HARQ transmission 210 as well as the mother code rate (R2). The code rate R1 of a first HARQ transmission 210 and puncturing ratio p_ratio may be related as $R1=R2/(1-p\_ratio)$, where $0 \leq p\_ratio < 1$. The puncturing ratio p_ratio and puncturing pattern used in the first HARQ transmission 210 may be needed by the receiver to decode the first HARQ transmission 210. Signaling in the first HARQ transmission 210 (such as in a preamble or header field) may be included to inform the receiver of the p_ratio or the puncturing pattern, depending on how the HARQ process is defined in a communication standard. For example, if the communication standard defines only 1 puncturing ratio (one p_ratio for mother code rate, or one p_ratio per mother code rate, or one p_ratio per MCS) and only 1 puncturing pattern, then signaling may not be needed. However, if the communication standard permits different puncturing patterns or puncturing rations (or different combinations thereof), then signaling may be included in the first HARQ transmission 210 to indicate the puncturing ratio, the puncturing pattern, or both. The signaling may include one or more bits to indicate the LDPC puncturing ratio or puncturing pattern. For example, the signaling may include 1 bit to indicate what bits to puncture (such as a "0" to indicate puncturing of parity bits only or a "1" to indicate puncturing of both info and parity bits). Alternatively, a few bits may be used to signal a value that corresponds to one of multiple choices regarding whether to puncture parity bits, info bits, or both. Additionally, a few bits may be used to signal a value that corresponds to one of multiple choices of puncturing ratio or puncturing pattern).

In response to the first HARQ transmission 210, the second WLAN device 120 may send a first feedback message 230 back to the first WLAN device 110. The first feedback message 230 may begin after a short interframe space (SIFS) 220, which represents a determinable time period to maintain synchronization in the WLAN. The first feedback message 230 may be one of a variety of different types of feedback messages 201. For example, the first feedback message 230 may be HARQ feedback type (such as a HARQ feedback message 270). Alternatively, the first feedback message 230 may be a non-HARQ feedback type (such as a traditional ACK message 280 or a Block ACK message 290). The first feedback message 230 may be a physical layer HARQ feedback (different from or transparent to a MAC feedback or ARQ used for MAC layer processing). For example, the first feedback message 230 provide feedback based on codeword group (CWG). Various options for feedback may depend on the size or type of CWG based feedback. For example, if a communication standard defines a fixed CWG (or a fixed CWG for certain throughput range or range of total number of codewords) but permits a flexible BA bitmap size, the BA bitmap size may be chosen among values (such as 16, 64, 256, 1024, among other examples). The BA bitmap size may be derived based on a legacy signal field (L-SIG) length field or indicated in signaling. Alternatively, if the communication standard defines a fixed BA bitmap size (such as, 16, 64, 256, 1024, among other sizes) but permits a flexible CWG size, the CWG size may be derived based on the total number of codewords divided by the BA bitmap size. Additionally, the CWG size may be chosen among a few values, such as 1, 2, 4, etc., and indicated in signaling. If the communication standard permits a flexible BA bitmap size and flexible CWG size, the BA bitmap size may be chosen among values (such as 16, 64, 256, 1024, among other examples) and can be derived based on the L-SIG length field or indicated in signaling. The CWG size may be derived based on the total number of codewords divided by the BA bitmap size. Alternatively, the CWG size may be chosen among a few values (such as 1, 2, 4, etc.) and indicated in signaling. In some implementations, the optimal BA bitmap size and CWG size for each scenario (given MCS, BW, NSS, range of number of codewords) may be derived form a table in the communication standard. In some implementations, the use of the smallest CWG size possible may be optimal for a HARQ process.

In some implementations, the first feedback message 230 may be a MAC acknowledgement or a MAC-like acknowledgement. For example, if the first HARQ transmission 210 is successfully decoded and passed to a MAC layer, the first feedback message 230 may be a MAC layer acknowledgement. Alternatively, if the first HARQ transmission 210 is not successfully decoded by the MAC layer, the first feedback message 230 may be a MAC HARQ feedback from the MAC layer or a HARQ BlockAck feedback from the PHY layer. For example, an ARQ BlockAck feedback (from MAC layer) may be replaced by a HARQ BlockAck feedback (from PHY layer) to improve spectral efficiencies. Typically, HARQ is transparent to the MAC layer and is used only in the PHY layer. However, the PHY layer may not know about the MPDU sizes and boundaries (MAC layer). Thus, in a HARQ BlockAck feedback design, the feedback resolution may be based on LDPC code block group or time segment. The HARQ feedback may use the same fixed BA bitmap size as ARQ, but the BA bitmap may be used for code block groups feedback. The BA bitmap size may equal the upper limit of number of code block groups. The CWG size may be derived based on the total number of codewords divided by the BA bitmap size. Alternatively, CWG size may be chosen among a few values, such as 1, 2, 4, etc., and indicated in signaling. Additionally, the BA bitmap can be used for time segments feedback. The BA bitmap size may equal the upper limit of number of time segments. The time segment size may be derived based on the total number of coded bits divided by the number of time segments.

If the first feedback message 230 is a HARQ feedback type, the first feedback message 230 may indicate negative acknowledgment for at least part of the first HARQ transmission 210. In response to receiving a negative acknowledgment, the first WLAN device 110 may retransmit the first set of data in a second HARQ transmission 240. The second HARQ transmission 240 may represent a retransmission 242 of a least some of the first HARQ transmission 210. This disclosure describes further optional features, structures, or content that may be included in the second HARQ transmission 240. For example, the second HARQ transmission 240 may include a partial retransmission of data based on the feedback (such as sub-band CQI, codeword groups, time segments, or the like).

This disclosure supports at least two scenarios regarding a HARQ retransmission (in the second HARQ transmission 240). For example, in a first scenario the second HARQ transmission 240 may be a HARQ retransmission only. In a second scenario, the second HARQ transmission 240 may be an aggregation of HARQ retransmission and new data transmission. For example, a first portion of the second HARQ transmission 240 may include a HARQ retransmission of a failed packet or portions of a failed packet and a second portion of the second HARQ transmission 240 may include a new data transmission. An indicator may be included in the second HARQ transmission 240 to indicate that the second HARQ transmission 240 includes an aggregation of retransmitted data and new data.

In the first scenario, if the HARQ ACK is an MPDU based ACK, one PPDU may be used to transmit an A-MPDU formed by the retransmitted MPDUs. If the HARQ ACK is a CWG or time segment based ACK, the HARQ retransmission may not have a clear MAC frame structure. One PPDU may be used for retransmission. The PHY structure may be an aggregation of the punctured codewords from failed CWGs (if CWG based HARQ ACK) or aggregation of coded bits from failed time segments (if time segment based HARQ ACK). If the HARQ ACK is a sub-band CQI based feedback and/or CWG based ACK then, the sending STA may retransmit all codewords (all MPDUs as in the initial transmission). Alternatively, the sending STA may determine that no codeword has been correctly decoded based on the sub-band CQI based feedback and retransmit all the MPDUs that were in the initial transmission. If the transmitter determines that only some codewords need be retransmitted, the HARQ retransmission may not have a clear MAC frame structure. One PPDU may be used for retransmission and the PHY structure may be an aggregation of the (punctured) codewords from failed codewords.

In the second scenario, in which the second HARQ transmission includes retransmission as well as new data, the content of the second HARQ transmission may depend on the feedback from the receiving STA. For example, if the HARQ ACK is an MPDU based ACK, one PPDU may be used to transmit an A-MPDU formed by the retransmitted MPDUs and new data MPDUs. The sending STA may use first (few) MPDU(s) for HARQ re-transmission(s) to minimize LLR buffer size so that the LLR buffer may be released after receiver processing of such MPDU(s) in a first portion of the second HARQ transmission. If the HARQ ACK is a CWG or time segment based ACK, the HARQ retransmission may not have a clear MAC frame structure. But the new data can have a MAC frame structure (A-MPDU), thus an aggregated PPDU (A-PPDU) may be used to include the retransmitted MPDUs and the new MPDUs. Each PPDU can be for HARQ re-transmission of (failed portions of) a failed packet, or new data. The PHY structure of each PPDU for HARQ re-transmission is an aggregation of the punctured codewords from failed CWGs (if CWG based HARQ ACK) or aggregation of coded bits from failed time segments (if time segment based HARQ ACK), in one failed packet. The PPDU for new data is an A-MPDU, formed by new data MPDUs. Similar to the earlier example, the sending STA may use first (few) PPDU(s) for HARQ re-transmission(s) to minimize LLR buffer size. LLR buffer may be released after receiver processing of such PPDU(s). There may be different ways to signal this option either in the preamble of the included PPDUs in the second HARQ transmission or in a preamble of the second HARQ transmission itself. For example, each PPDU may have its own signal field (such as the extremely high throughput signal (EHT-SIG) field) to signal a separate set of parameters, followed by data and possible padding or PPDU extension. Alternatively, sets of parameters for the PPDUs may be signaled upfront in the EHT-SIG before any data. Each PPDU may have a certain integer number of OFDM symbols.

Continuing with the second scenario, in which the second HARQ transmission includes retransmission as well as new data, the content of the second HARQ transmission may be in response to a HARQ ACK that has CWG or time-segment based feedback. In such case, the HARQ retransmission does not have a clear MAC frame structure. But the new data can have a MAC frame structure (A-MPDU), so that one PPDU may be used. Data generation for HARQ retransmission and new data may be separate and the PPDU is an aggregation of HARQ re-transmission and new data at a certain level. Due to separate encoding, the HARQ re-transmitted data and new data may have separate pre-FEC padding, service fields and possible tail bits if BCC, post-FEC padding, and use different scrambling seeds. The sending STA may aggregate HARQ re-transmitted data before new data to minimize LLR buffer size so that the LLR buffer may be released after the receiving STA processes the HARQ re-transmitted data. The aggregation of HARQ re-transmitted data and new data may happen at different points in the transmit block diagram. For example, the aggregation may be done at coded bit level before interleaving and QAM modulation, with possible padded bits in between. Alternatively, the aggregation may be done at QAM level after interleaving/LDPC tone mapping but before spatial mapping, with possible padded QAM symbols in between. When using BCC encoding, the aggregation may be done after interleaving and QAM modulation. When using LDPC encoding, the aggregation may be done after both QAM modulation and LDPC tone mapping. In another example, the aggregation is at QAM level after spatial mapping, with possible padded QAM symbols in between. The first part (such as HARQ re-transmitted QAM symbols) may be first mapped to subcarriers and fill an integer number of OFDM symbols. The leftover of the first part may fill a number of subcarriers in an OFDM symbol afterwards. Some padding may fill some subcarriers in that OFDM symbol. The second portion of the second HARQ transmission (such as new data QAM symbols) may fill the rest of the subcarriers in that OFDM symbol, and other OFDM symbols. And this process is repeated until multiple parts are aggregated. This technique may permit the receiving STA to process and release buffer for HARQ re-transmission faster than when using aggregation at the coded bit level or before spatial mapping.

Continuing with the second scenario, in which the second HARQ transmission includes retransmission as well as new data, the content of the second HARQ transmission may be in response to a HARQ ACK that has sub-band CQI based feedback and/or CWG (or time segment) based ACK. In this case, the second HARQ transmission may be used to transmit an A-MPDU formed by all MPDUs in the initial transmission and new data MPDUs. Alternatively, if the sending STA determines, based on the sub-band CQI based feedback, that no codeword has been correctly decoded at receiver, the second HARQ transmission may include an A-MPDU formed by all MPDUs in the initial transmission and new data MPDUs. If the sending STA determines that only some codewords need be retransmitted, the second HARQ transmission may not have a clear MAC frame structure, but the new data can have a MAC frame structure (A-MPDU). An aggregated PPDU (A-PPDU) may be used in this case. Each PPDU can be for HARQ re-transmission of (failed portions of) a failed packet, or new data. The PHY structure of each PPDU for HARQ re-transmission may be an aggregation of the punctured codewords from failed CWGs (if CWG based HARQ ACK) or aggregation of coded bits from failed time segments (if time segment based HARQ ACK), all in one failed packet. The PPDU for new data is an A-MPDU, formed by new data MPDUs. Alternatively, the data generation for retransmission and new data may be separate. The PPDU may be an aggregation of HARQ re-transmission and new data at a certain level (such as the coded bit level, at the QAM level after interleaving, or after QAM modulation or after spatial mapping, as described above). The retransmitted data and the new data can be multiplexed in time by placing the retransmitted data before the new data in the PPDU. Alternatively, the retransmitted data and the new data may be multiplexed in frequency by sending the retransmitted data in one or more resource units (RUs) and the new data in another RU or set of RUs.

The signaling in the second HARQ transmission may include signaling similar to the signaling described for the first HARQ transmission, as well as other signaling. For example, the second HARQ transmission may include an A-PPDU indicator and number of PPDUs if A-PPDU is used. The second HARQ transmission may include an indicator to indicate the number of parts that make up the second HARQ transmission if other forms of aggregation are used. The second HARQ transmission may include signaling that is common to multiple parts (the first portion with retransmissions and the second portion with new data). For example, the common signaling may include a STA ID, a requested ACK type or granularity type of HARQ (such as CC, IR, etc.), the sub-band power boosting indication (enabled/disabled and boosted power in dB per sub-band or certain granularity). If the second HARQ transmission is an A-PPDU, the signaling for each PPDU may include an indication of the number of spatial streams, pre-FEC padding factor (a value), PPDU extension (replacing packet extension (PE)) disambiguity, among other examples. The signaling in the second HARQ transmission may include signaling for each part, such as a HARQ indicator & transmission counter (such as indicating HARQ whether the part is a $2^{nd}$ transmission (retransmission), or a $1^{st}$ transmission (implying new data). The signaling for each part of the second HARQ transmission may include a length, coding type (BCC, LDPC, or a modified coding for HARQ), the ldpc_extra_symbol bit per part (if LDPC encoding is used), MCS information, or the like. The MCS information may include coding rate, modulation, and possible puncturing ratio (p_ratio) from mother codeword (if LDPC) or coded bits (if BCC) and puncturing pattern. Though the mother code rate may be known, the re-transmission is a punctured version of mother codewords. Therefore, the signaling may indicate a value that defines code rates or puncturing patterns in relation to the mother codeword (such as only puncturing parity bits, puncturing both info bits and parity bits, puncturing x bit(s) every y bits, etc.). The signaling for each part of the second HARQ transmission may include a scrambling seed and padding.

There may be ways to reduce duration of the second HARQ transmission. For example, wait time may be reduced by having a more compact transmit sequence or reducing chance of collision by reducing SIFS between packets. Wait time may be reduced by having the HARQ BlockAck feedback or the second HARQ transmission start sooner than the SIFS. The duration of the second HARQ transmission may be reduced by reducing some signaling. For example, it may be unnecessary to carry some of the same info as in first HARQ transmission and the redundant signaling may be omitted in the second HARQ transmission. A signal field value (such as a HARQ indicator or transmission count) in the second HARQ transmission that indicates that the packet is a second HARQ transmission can be sufficient to imply some of the signaling that was included in the first HARQ transmission, such as format, beam change, UL/DL, BSS color, STBC, TxBF, Doppler, or the like. The duration of the second HARQ transmission maybe reduced by reducing a long training field (LTF). For example, if channel variation between the first HARQ transmission 210 and the second HARQ transmission 240 is very small, it may be unnecessary to send LTF symbols for channel estimation. Instead, the LTF field may be replaced by a symbol to aid timing/frequency/phase synchronization between two HARQ transmissions and adjust channel estimate for the second HARQ transmission 240 based on the first HARQ transmission 210. If the second HARQ transmission 240 includes the LTF field, it may include a shorter LTF and guard interval (GI) than was used for the first HARQ transmission 210. Channel estimates from two transmissions may be combined to yield a channel estimate used for processing the second HARQ transmission 240.

Following the second HARQ transmission 240, the second WLAN device 120 may send a second feedback message 250. Because HARQ utilizes memory to buffer and combine multiple HARQ transmissions, it may be desirable to limit the quantity of HARQ retransmissions. The limit may be a network-based configuration, a device setting, or a user-managed setting. In the example HARQ process 200, the maximum number of HARQ retransmissions may be two. Therefore, the second feedback message 250 may complete the HARQ process.

FIG. 2 may be used to describe some alternative behaviors which can be implemented in a HARQ protocol. In one aspect, the first feedback message 230 may be used to end the HARQ process and prevent the first WLAN device 110 from sending the second HARQ transmission 240. As an example, the first feedback message 230 may be a non-HARQ feedback type. Upon receiving the first feedback message 230, the first WLAN device 110 may determine that the first feedback message 230 is a non-HARQ feedback type and refrain from communicating the second HARQ transmission 240.

There may be a variety of conditions which would cause the second WLAN device 120 to use a non-HARQ feedback type for the first feedback message 230. For example, if the first HARQ transmission 210 was successfully decoded, the first feedback message 230 may be used to prevent the second HARQ transmission 240. In another example, the first HARQ transmission 210 may include a plurality of MPDUs. If most of the MPDUs were successfully decoded by the second WLAN device 120, it may be more efficient to use a traditional retransmission message (rather than the second HARQ transmission 240). The first feedback message 230 may use the Block ACK message 290 to indicate which MPDUs are missing. Based on the Block ACK feedback, the first WLAN device 110 may retransmit the failed MPDUs in a new (non-HARQ) aggregate MPDU (AMPDU) frame. In another example, the second WLAN device 120 may detect a low memory condition associated with buffering the first HARQ transmission 210. Because HARQ uses memory to buffer and combine HARQ transmissions, if the second WLAN device 120 does not have enough memory to process the second HARQ transmission 240, the second WLAN device 120 may prematurely end the HARQ process by sending a non-HARQ feedback message type.

When either the first feedback message 230 or the second feedback message 250 is a non-HARQ feedback type, the HARQ process may be terminated. In some implementations, the second feedback message 250 may always be a non-HARQ feedback type, such as when the HARQ protocol has a maximum limit of two HARQ transmissions for the same source data. Following the HARQ process for a first set of data, the HARQ process may be restarted for a second set of data.

This disclosure describes further optional features regarding types and content of acknowledgement packets and the HARQ process. For example, the HARQ process may use a PHY acknowledgement or a MAC acknowledgment. The duration/timing of the acknowledgement may be determined using a predefined calculation. Furthermore, the acknowledgement messages may have varying types of granularity which can be used for partial retransmission. A communication standard may define rules for determining an MCS for a HARQ retransmission. In HARQ protocols that use CQI feedback, the CQI feedback may be used for rate adaptation (such as changing the MCS) for further HARQ transmissions. Additionally, or alternatively, the CQI feedback may be used to determine sub-bands for nulling or power boosting in future HARQ transmissions.

The feedback duration for the first feedback message 230 may depend on the type of feedback message, the feedback granularity, or both. The time for a retransmission may depend on the feedback duration. For example, if the first HARQ transmission 210 is successfully decoded, the first feedback message 230 may be sent and the feedback duration (fb_dur_arq) may be based on the SIFS and the MAC layer feedback and the sending STA may not send a retransmission. (fb_dur_arq=SIFS+ACK_pkt_dur). However, if the first HARQ transmission 210 is not successfully decoded in the PHY layer or was not successfully processed by the MAC layer, the feedback duration may be different. In traditional feedback protocols, no ACK may be sent (fb_dur_arq=AckTimeout) or a MAC layer BlockAck may be sent with BA bitmap of MPDUs (fb_dur_arq=SIFS+BlockACK_pkt_dur+SIFS). The sending STA may send a retransmission following the fb_dur_arq time. However, if the first feedback message 230 is a PHY layer feedback, a PHY H-ACK/NACK may be sent with BA bitmap of certain resolution, and the sending STA may send a retransmission (the second HARQ transmission 240). After combining of first HARQ transmission 210 and the second HARQ transmission 240, use the ARQ process (in MAC layer). The feedback duration may be based on the HARQ feedback and ARQ feedback durations. (fb_dur_1=SIFS+HACK_pkt- _dur+SIFS+fb_dur_arq). There also may be additional feedback duration over ARQ: extra_fb_dur_1=fb_dur_1-fb_dur_arq=SIFS+HACK_pkt_dur+SIFS. In the examples where a MAC layer feedback or a MAC-like feedback (from the PHY layer) is used in response to the first HARQ transmission 210, the feedback duration may be based on the duration of the MAC H-ACK/NACK or the H-ACK/NACK having a BA bitmap of certain resolution, and the sending STA may responds with the first feedback message 230. (fb_dur_2=SIFS+HACK_pkt_dur+SIFS). There also may be additional feedback duration over ARQ: extra_fb_dur_2=fb_dur_2-fb_dur_arq.

Figure 3:
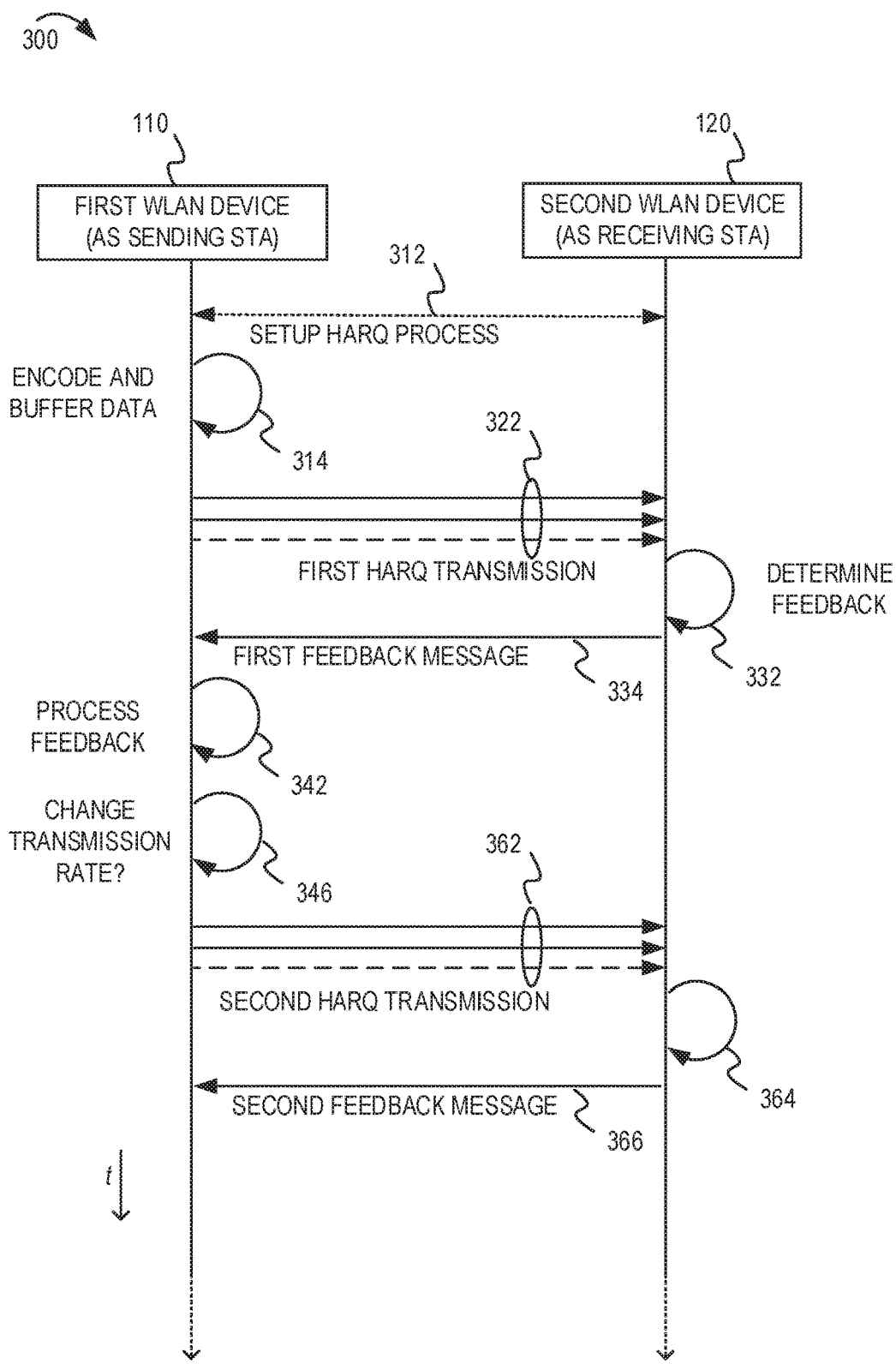
FIG. 3 depicts an example message flow diagram associated with a HARQ protocol.

FIG. 3 depicts an example message flow diagram associated with a HARQ protocol. The example message flow 300 shows the first WLAN device 110 (as the sending STA) and the second WLAN device 120 (as the receiving STA). The first WLAN device 110 and the second WLAN device 120 may exchange configuration messages 312 (such as the example of FIG. 8) to setup the HARQ process. In some implementations, the HARQ configuration may be set ahead of time and reused for subsequent HARQ processes.

At process 314, the first WLAN device 110 may encode and buffer a first set of data for the HARQ process. The first HARQ transmission 322 may include multiple MPDUs or segments of the first set of data. At process 332, the second WLAN device 120 may determine which type of feedback message to send back to the first WLAN device 110. The first feedback message 334 may be formatted using a non-HARQ feedback type or a HARQ feedback type. In the example of FIG. 3, the first feedback message 334 is a HARQ feedback type. At process 342, the first WLAN device 110 may process the first feedback message 334 and determine to send a second HARQ transmission.

In some implementations, the first feedback message 334 may include parameters to modify the MCS for the second HARQ transmission. For example, the first feedback message 334 may indicate a different order of modulation to use for the second HARQ transmission. At process 346, the first WLAN device 110 may determine the MCS to use for the second HARQ transmission and prepare the second HARQ transmission using the new MCS. The second HARQ transmission 362 may have identical data as the first HARQ transmission 322. In some implementations, the first feedback message 334 may include feedback information regarding which portions of the first HARQ transmission 322 were not successfully decoded. Based on the feedback information, the first WLAN device 110 may prepare the second HARQ transmission 362 as a partial retransmission of the first HARQ transmission 322.

Following the second HARQ transmission 362, the second WLAN device 120 may combine the second HARQ transmission 362 with the first HARQ transmission 322 to decode the combined HARQ transmissions. In some implementations, log-likelihood ratio (LLR) calculations may be used to combine and decode the HARQ transmissions 322, 362. The second WLAN device 120 may determine feedback 364 based on decoding the combined HARQ transmissions and send a second feedback message 366. As described above, the second feedback message 366 may end the HARQ process by using a non-HARQ message type to cause the first WLAN device 110 to refrain from further HARQ transmissions for the first set of data.

Figure 4:
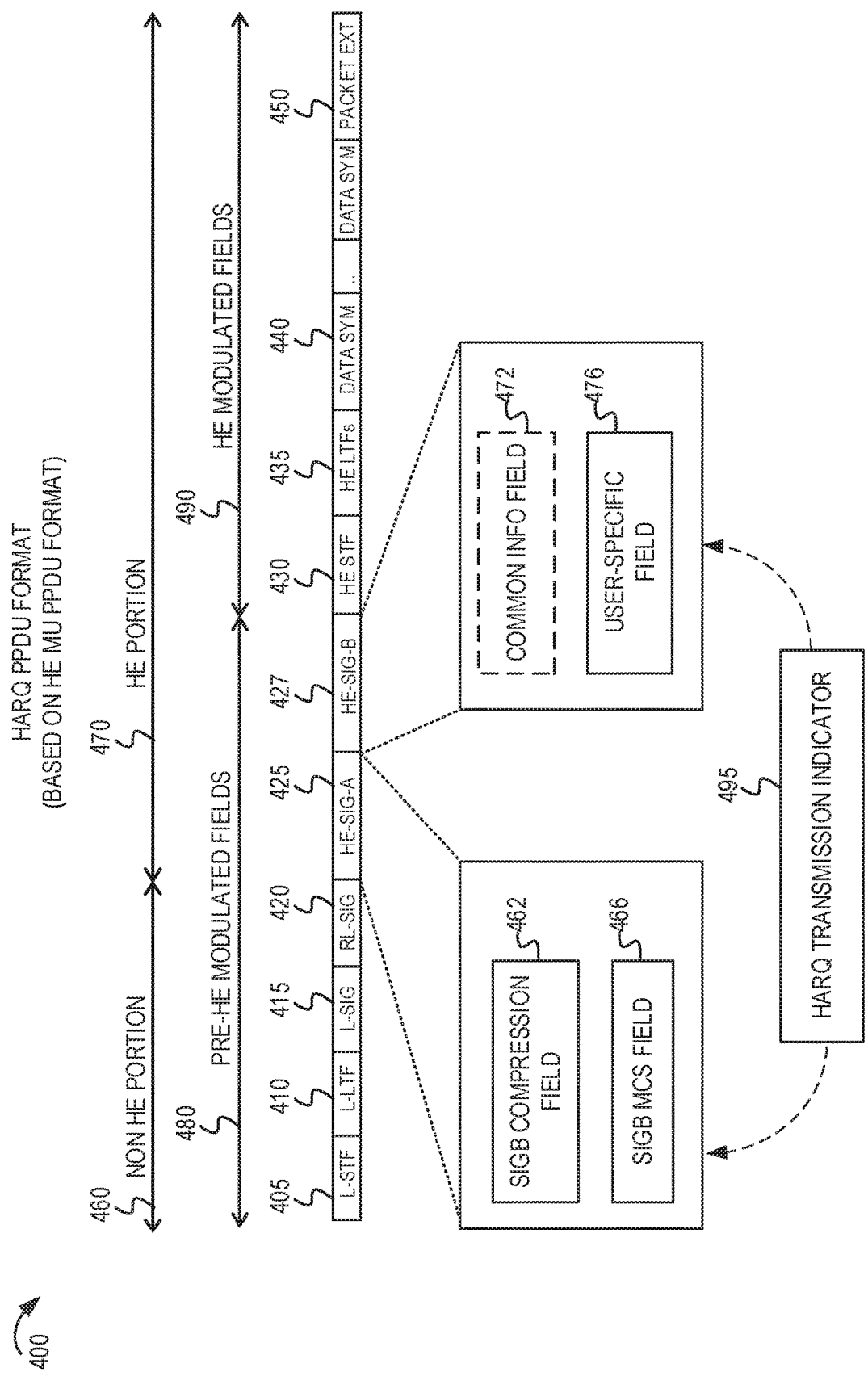
FIG. 4 depicts an example physical layer (PHY) protocol data unit (PPDU) format for HARQ transmissions.

FIG. 4 depicts an example PPDU format for HARQ transmissions. The HARQ PPDU format 400 may be based on a HE MU PPDU format defined in IEEE 802.11ax with some modifications. Although the HE MU PPDU format is typically used to aggregate communications to multiple STAs, in some implementations the HE MU PPDU may be used to communicate with a single STA. In some implementations, the HARQ PPDU format 400 may repurpose some fields of the HE MU PPDU format. For example, predetermined values may be defined for some fields of the HE MU PPDU format to cause a receiving STA to identify a MU-PPDU as a HARQ PPDU.

In addition to identifying the PPDU as a HARQ PPDU, it is desirable for a receiving STA to determine whether the HARQ PPDU is intended for it. For example, a header of the HARQ PPDU may include a first identifier associated with the sending STA and a second identifier associated with the receiving STA. In some implementations, one of the identifiers may be a BSS color associated with an AP (where the AP is the sending STA or the receiving STA). In some implementations, the BSS color associated with HARQ transmissions to or from the AP may be the same BSS color that the AP uses for non-HARQ transmissions. Alternatively, a new (second) BSS color may be associated with the AP and used for HARQ transmissions while an original (first) BSS color may be used for non-HARQ transmissions. For downlink HARQ transmissions (from an AP to a receiving STA), the STA ID may identify the receiving STA. For uplink HARQ transmissions (from a sending STA to an AP), the STA ID may identify the sending STA.

Turning to the HARQ PPDU format 400, each field and portion will be briefly described. A non-HE portion 460 includes a legacy short training field 405 (L-STF), a legacy long training field 410 (L-LTF), and a legacy signal field 415 (L-SIG). The remaining portion of the PPDU is considered an HE modulated portion 470 because it includes features that are relevant to devices capable of HE transmissions. The pre-HE modulated fields 480 include the non-HE portion 460 as well as some fields to bootstrap the HE modulated fields 490. For example, the pre-HE modulated fields 480 may further include a repeated legacy signal field 420 (RL-SIG), a first HE signal field 425 (HE-SIG-A), and a second HE signal field 427 (HE-SIG-B). The repeated legacy signal field 420 and the first HE signal field 425 may be modulated using a more reliable (robust) modulation than has lower throughput than the modulation scheme using for the HE modulated fields 490.

The HE modulated fields 490 includes an HE short training field 430 (HE STF), one or more symbols for an HE long training field 435 (HE LTF), one or more data symbols 440, and may include a packet extension field 450. The HE modulated fields 490 is modulated using inverse fast Fourier transform (IFFT) to convert the signal to orthogonal carrier transmissions in the time domain.

The HE-SIG-A may include fields such as a SIGB Compression field 462 and a SIGB MCS field 466. There may be other fields (not shown) in the HE-SIG-A. For example, a Number of Users field (not shown) may indicate only 1 users if the HARQ PPDU is being used for a single user. A value of "1" in the SIGB Compression field 462 may be used to indicate a short format for the HE-SIG-B field, such as when the HARQ PPDU is being sent to a single user. When the SIGB Compression field 462 indicates "1," a common information field 472 may be eliminated from the HE-SIG-B field to reduce overhead. The HE-SIG-B field may include one or more user-specific fields 476. In the example where the HARQ PPDU is being sent to a single user, there will be only one user-specific field 476.

To help the receiving STA identify the PPDU as a HARQ transmission, the HARQ PPDU format 400 may include a HARQ transmission indicator 495. The HARQ transmission indicator 495 may be included in the HE-SIG-A or the HE-SIG-B, or both. Furthermore, there may be different ways to include a HARQ transmission indicator. In some implementations, the HARQ transmission indicator 495 may be represented by a combination of predetermined values in the fields of a HE MU PPDU format. For example, the HARQ transmission indicator 495 may be indicated in a reserve bit (B7) of the HE-SIG-A. Alternatively, the HARQ transmission indicator 495 may be represented using one of the current reserved value for bits B1-B3 (which are the SIGB MCS field 466). For example, a specified value of "6" in the SIGB MCS field 466 may indicate a first HARQ transmission and a specified value of "7" may indicate a second HARQ transmission. The SIGB MCS field 466 is traditionally used to indicate which MCS is used for the HE-SIG-B. However, because there may be only one user-specific field 476 in the HE-SIG-B, the size of the HE-SIG-B is relatively small (such as, and for example, 21 data bits and 10 error checking bits). Due to the small size of the HE-SIG-B there may not be much efficiency savings associated with changing the MCS for the HE-SIG-B. Therefore, when the SIGB MCS field 466 includes one of the specified reserved values (such as "6" and "7" above) as the HARQ transmission indicator 495, the PPDU may not change the MCS for the HE-SIG-B. For example, the sending STA and the receiving STA may use a predetermined MCS (such as MCS0) for the HE-SIG-B.

In some implementations, the HARQ transmission indicator 495 may be indicated in the HE-SIG-B. For example, the HARQ transmission indicator 495 may be represented by a custom STA ID in the user-specific field 476. A receiving STA may be assigned a custom STA ID dedicated for HARQ transmission to it. For example, the STA may use a first STA ID for non-HARQ transmissions and a second STA ID for HARQ transmissions. The STA may listen for both the first STA ID and the second STA ID when receiving PPDUs.

Another alternative for the HARQ transmission indicator 495 may use a reserved bit in the user-specific field 476. There may be other ways to represent the HARQ transmission indicator 495 in the PPDU.

In some implementations, a HARQ transmission may be included in an aggregated PPDU. For example, an aggregated PPDU (A-PPDU) may include a second HARQ transmission as well as new data. The frame format of the A-PPDU may take a variety of forms. For example, the A-PPDU may combine multiple PPDUs, each having their own signaling, code rate, modulation, encoding, or the like. A first PPDU may be a HARQ PPDU (such as those described herein) and a second PPDU may be used for new data.

Figure 5A:
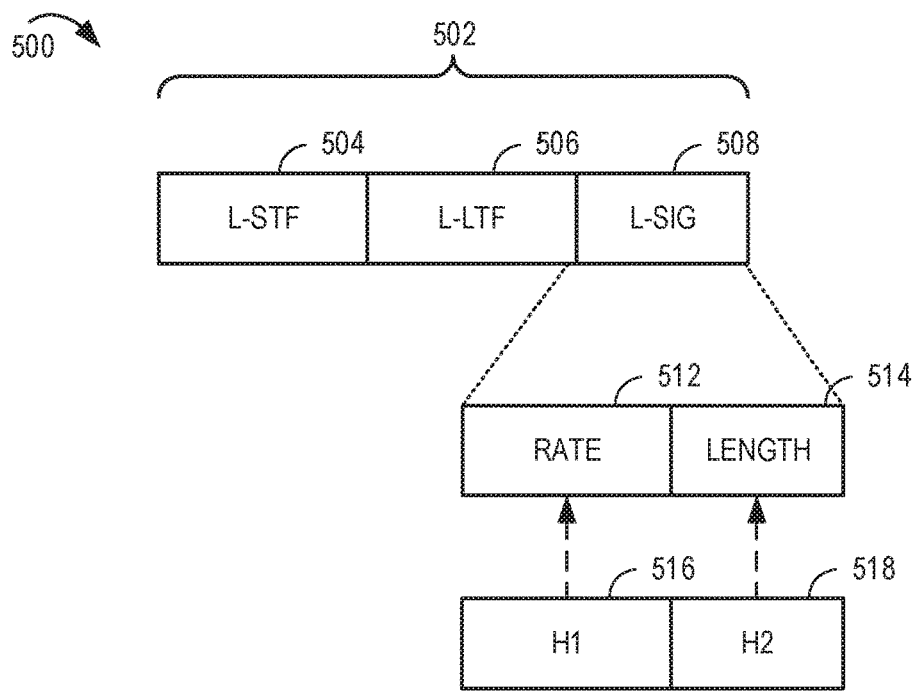
FIG. 5A depicts a first example HARQ feedback message format.
Figure 5B:
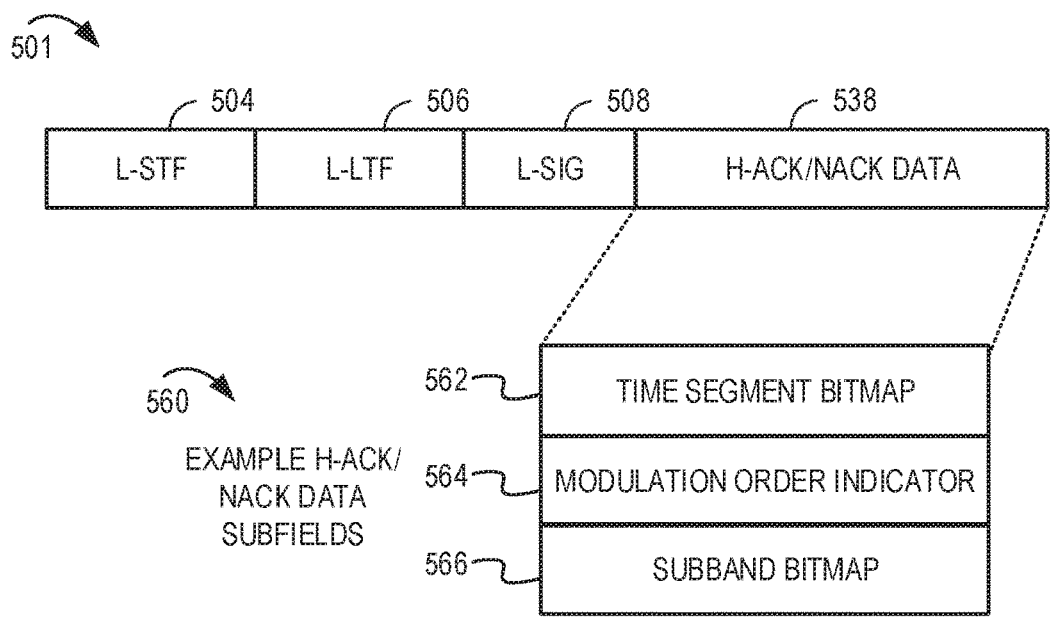
FIG. 5B depicts a second example HARQ feedback message format.

Although FIGS. 5A and 5B describe some examples of how a PPDU may be formatted for use in a HARQ process, there may be other example implementations. For example, a wireless communication standard may define the formatting of HARQ PPDUs. A PPDU may be formatted to carry different information elements. In some implementations, an existing information element may be modified to include a new field for the HARQ information. In another example, a new sub-element may be defined for the HARQ information. In some implementations, an existing field may be repurposed to carry the HARQ information. For example, a reserved field or a field that is deprecated or not applicable in the communication system may be repurposed to in the wireless communication standard so that the existing field may be defined for the new purpose of carrying the HARQ information. In another example implementation, a new information element may be defined to convey the HARQ information. This disclosure includes several options for signaling in a PPDU used for HARQ.

FIG. 5A depicts a first example HARQ feedback message format. The first example HARQ feedback message format 500 may be based on a legacy preamble associated with legacy WLAN frame format 502. The legacy preamble is approximately 20 μs in duration, making it well-suited for a short HARQ feedback message format. The HARQ feedback message format 500 may include a legacy short training field 504 (L-STF), a legacy long training field 506 (L-LTF), and a legacy signal field 508 (L-SIG). The L-STF and the L-LTF are used for detection and synchronization using predetermined training sequences. Thus, the L-SIG field is the only portion of the legacy preamble which carries data. The L-SIG field includes a set of bits for indicating a rate setting 512 and a set of bits for indicating a length 514 of the legacy WLAN packet that would normally follow the legacy preamble. In the example, of FIG. 5A, the short HARQ feedback message may end with the L-SIG. Therefore, a value of "0" for the length 514 may be used to indicate a HARQ feedback. Similarly, there may be unused values for the rate field 512 that can be redefined in combination with the length field 514 to indicate HARQ feedback. Thus, the rate field 512 and the length field 514 may be repurposed to carry HARQ feedback fields H1 516 and H2 518. Below is a table showing some example definitions for the H1 (in rate field) and H2 (in length field). The table below (Table 1) is provided only as an example. Other combinations of values or definitions of the fields may be possible.

TABLE 1

| NACK Type | H2 (LENGTH field = 12 bits) | H1 (RATE field = 4 bits) | Notes |
| --- | --- | --- | --- |
| Simple NACK | 0 | 0000 | Retransmit the entire packet with same MCS |
| NACK with Time Segment Indication | 0 | $x_1x_2x_3x_4$, $x_i = 0$ or 1 | Bit $x_i$ correspond to the transmission request for the $i^{th}$ segment. 0: needs retransmission 1: segment successfully received |
| NACK with Mod Order(M) Indication | 1 | 1101: M, 1111: M-1 0101: M-2 | $2^{\wedge}M$ is modulation order of the first HARQ transmission. The second HARQ transmission will use $2^{\wedge}M$, $2^{\wedge}(M-1)$ or $2^{\wedge}(M-2)$. |

The Simple NACK may cause the sending STA to send the second HARQ transmission as an identical retransmission of the first HARQ transmission. For example, the second HARQ transmission may use the same MCS and include all the parts of the first HARQ transmission.

The NACK with time segment indication may be used to indicate which time segment of the first HARQ transmission to retransmit in the second HARQ transmission. For example, the first HARQ transmission may be divided into 4 time segments which can be represented by different bits in a bitmap. For each bit in the bitmap, a first value (zero) may indicate that the time segment should be included in the second HARQ transmission.

The NACK with modulation order indication may be used to cause the sending STA to send the second HARQ transmission using a different MCS than what was used with the first HARQ transmission. For example, a lower order modulation may improve reliable demodulation of the second HARQ transmission. The sending STA may send the second HARQ transmission using the lower modulation order based on the bits included in the HARQ feedback message format 500.

The example in FIG. 5A describe ways to request partial retransmission of time segments. However, other ways of requesting partial retransmission may be possible. For example, the HARQ feedback message may request retransmission of particular sub-bands, code blocks, groups of code blocks, MPDUs, or groups of MPDUs.

FIG. 5B depicts a second example HARQ feedback message format. The second example HARQ feedback message format 501 may be based on a legacy preamble (L-STF 504, L-LTF 506, and L-SIG 508) followed by HARQ ACK/NACK data field 538. There may be different subfields in the HARQ ACK/NACK data field 538. FIG. 5B shows several example H-ACK/NACK data subfields 560, including a time segment bitmap 562, a modulation order indicator 564, and a sub-band bitmap 566. Below is a table showing some example definitions for the example H-ACK/NACK data subfields. The table below (Table 2) is provided only as an example. Other combinations of values or definitions of the fields may be possible.

TABLE 2

| Example H-ACK/NACK data Subfield | Bit Width | Notes |
|---|---|---|
| Time Segment Bitmap 562 | 8 bits | Each bit corresponds to ⅛th of the data portion of the first HARQ transmission. =0: Need retransmission =1: no need for retransmission |
| Modulation order indication 564 | 2 bits of value i = 0, 1, 2, 3 | Suggested modulation order of 2^(M-i) for the second HARQ transmission. 2^M is the modulation order of the first HARQ transmission |
| Sub-band bitmap indication 566 | 4 bits | Indicate which sub-band(s) to retransmission bit = 0: needs retransmission |
| Overhead (not shown) | CRC 4 bits + Tail: 6 bits | |

The time segment bitmap 562 may be used to indicate which time segment of the first HARQ transmission to retransmit in the second HARQ transmission. For example, the first HARQ transmission may be divided into 8 time segments which can be represented by different bits in a bitmap. For each bit in the bitmap, a first value (zero) may indicate that the time segment should be included in the second HARQ transmission.

The modulation order indication 564 may be used to cause the sending STA to send the second HARQ transmission using a different MCS than what was used with the first HARQ transmission. For example, a lower order modulation may improve reliable demodulation of the second HARQ transmission. The sending STA may send the second HARQ transmission using the lower modulation order based on the bits included in the HARQ feedback message format 500.

The sub-band bitmap 566 may indicate which sub-bands to include in the second HARQ transmission. For example, the first HARQ transmission may be defined by 4 frequency sub-bands. A first value (zero) may indicate that the frequency sub-band should be included in the second HARQ transmission. In some implementations, the sub-bands may be associated with 20 MHz sub-bands of a 160 MHz bonded channel.

As described above, the HARQ feedback message may request retransmission of particular time segments or sub-bands. Other variations may be possible. For example, the HARQ feedback message may request retransmission of particular code blocks, groups of code blocks, MPDUs, or groups of MPDUs.

The examples in FIGS. 5A and 5B are intended as illustrative examples, and other variations may be possible. For example, other examples may provide for different granularity types in the HARQ Ack. In a first type, the feedback granularity may be based on MPDUs. MPDU based ACK may be based on decoding MPDU delimiter and validation by FCS. However, MPDU based ACK may be undesirable in some implementations because HARQ may be a PHY process and the PHY may not give the decoded bits to the MAC layer if the first HARQ transmission fails. Furthermore, if a MAC header is corrupt, or some delimiters in the initial packet are not found or corrupt (has an out of range length value, or an invalid signature or CRC-8), the receiving STA may not understand the A-MPDU frame structure of the first HARQ transmission. Therefore, other feedback granularity types may be desirable. In a second type of granularity, the feedback may be based on time segments (such as the duration associated with a few OFDM symbols, a certain duration in time, an LLR buffer portion, among other examples) with varying size. For example, the receiving STA may evenly divide the entire packet (or entire LLR buffer) into a quantity of segments (such as 8 segments) to determine feedback for each segment. The segment size may depend on the packet size but not the MCS. A time segment based ACK may be based on LDPC codeword parity check if LDPC encoding is used.

In another feedback granularity type, the feedback may be based on an LDPC codeword or an LDPC codeword block group (CWG) with fixed number of codewords in the CWG. The CWG based ACK may be based on LDPC codeword parity check if LDPC encoding is used. In another feedback granularity type, the feedback may be related to the entire packet, such as feedback based on PHY CRC and/or MAC FCS. In another feedback granularity type, the feedback may be based on whole band CQI or sub-band CQI with certain sub-band granularity, or both. Each value of the whole band CQI and sub-band CQI may use a few bits to indicate the channel quality in decibels (dB). The size of feedback (or quantity of bits) and indication values may be similar to CQI feedback used in sounding. Alternatively, the indication values use quantized values in dB or codebook-based indication. The sub-band CQI feedback can softly indicate ACK or NACK because with channel quality, the sending STA can determine if bits in certain sub-bands are reliable or not. With this knowledge, the sending STA may determine that certain codewords are received correctly or not. The sub-band CQI may be used alone for ACK/NACK indicating purpose, or jointly with other ACK feedback types, and also may be used by the sending STA to adjust MCS in retransmission.

In some implementations, a HARQ feedback message may include signaling or content to indicate the content or format of the HARQ feedback message. The following content may be included in HARQ ACK feedback:

STA ID: if the sending STA is expecting an immediate HARQ ACK feedback after a data packet, the STA ID may not be needed in signaling. However, if a delayed feedback may be received, the STA ID may be included.

HARQ indicator (indicating that the transmission is an HARQ ACK feedback, instead of ARQ).

Indicator to indicate the feedback granularity type and granularity. As described in the previous paragraph, there may be different types of granularity for the feedback. If the sending STA is aware of the requested feedback granularity, signaling may not be needed to indicate the type of feedback granularity. However, in some implementations, the receiving STA may indicate the granularity, such as CWG group size or time segment size.

Indicator to indicate granularity of ACK, such as whether the ACK is for an entire packet, or a BA bitmap, each bit for a certain granularity. If CQI based feedback is used, the indicator may indicate whether the CQI feedback refers to the whole bandwidth and/or sub-band(s) to let sending STA adapt MCS in a retransmission and/or indicate reception quality of bits.

Figure 6A:
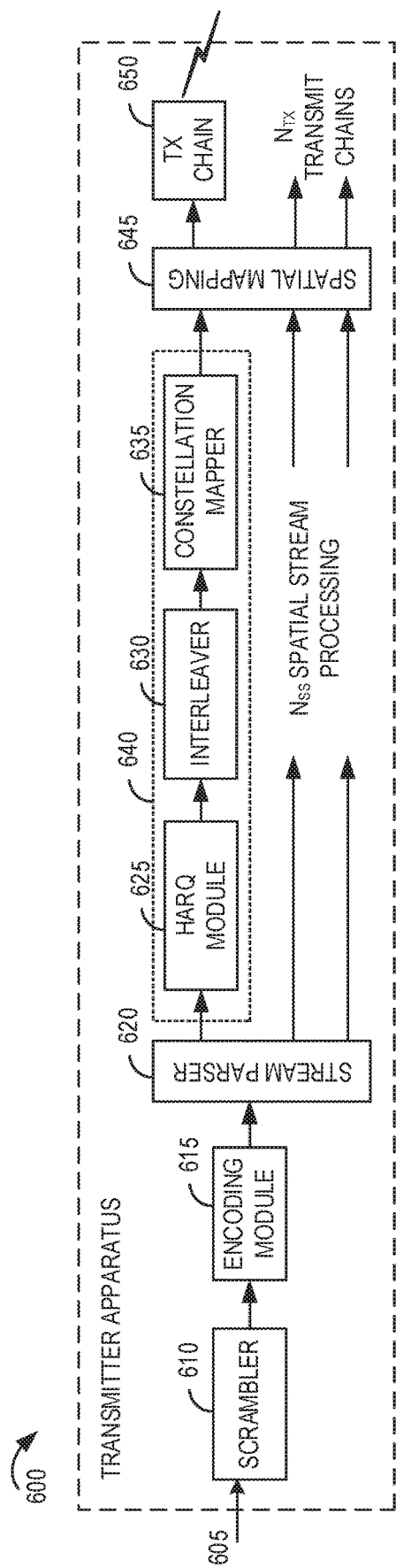
FIG. 6A depicts a block diagram of an example transmitter apparatus for a sending STA that supports a HARQ protocol.

FIG. 6A depicts a block diagram of an example transmitter apparatus for a sending STA that supports a HARQ protocol. The example transmitter apparatus 600 shows some of the functional blocks in a sending STA. The example transmitter apparatus 600 is one or may designs for a transmitter. In this figure, the example transmitter apparatus 600 is designed for BCC encoding. Another design (not shown) may support LDPC encoding. In the design described in FIG. 6A, source data 605 may be processed by a scrambler 610 and an encoding module 615. The scrambler 610 may scramble the source data 605 to reduce the probability of long sequences of zeros or ones. The scrambler 610 may use a seed to determine the scrambled bits. In some implementations, a transmitting STA may indicate a scrambling seed or state in a message (such as a first HARQ transmission) to the receiving STA. In some implementations, the retransmitted data in a second HARQ transmission may use the same scrambling as the original data in a first HARQ transmission. Using the same scrambling may enable the receiving STA to combine the HARQ transmissions before performing descrambling. Further options and examples regarding the scrambling are included in this disclosure.

The encoding module 615 may perform encoding for error correction and error detection. For example, the encoding module 615 may perform FEC and add redundancy or CRC bits to the source data. The encoder may use BCC to encode the data. The encoded data may be sent to a stream parser 620 that divides the encoded data into $N_{SS}$ spatial streams. In some implementations, there may only be one spatial stream and the stream parser 620 may be unused. An example of spatial stream processing 640 may include a HARQ module 625, an interleaver 630, and a constellation mapper 635. The HARQ module 625 may buffer encoded bits for the spatial stream so that they can be used, if necessary, for a second HARQ transmission. Although show before the interleaver 630, in some implementations the HARQ module 625 may be positioned before the stream parser 620 or after the interleaver 630. Alternatively, there may be multiple HARQ modules in the transmitter apparatus 600 to support different options for partial HARQ retransmission. The interleaver 630 interleaves the bits of each spatial stream (changes order of bits) to prevent long sequences of adjacent noisy bits from entering the BCC decoder. The interleaver 630 may be present in transmitter designs that use BCC encoding. When LDPC encoding is used (rather than BCC), the interleaver 630 may be omitted. Interleaving is applied only when BCC encoding is used. The constellation mapper 635 maps the sequence of bits in each spatial stream to constellation points (complex numbers). The constellation mapper 635 may perform the modulation of the bits based on an MCS that defines the constellation points.

After the spatial streams are processed, a spatial mapping 645 may map space-time streams to $N_{TX}$ transmit chains (including TX chain 650). There may be different ways of mapping the streams to transmit chains. For example, in a direct mapping the constellation points from each space-time stream may be mapped directly onto the transmit chains (one-to-one mapping). Another example may use spatial expansion, in which vectors of constellation points from all the space-time streams are expanded via matrix multiplication to produce the input to all of the transmit chains. The spatial mapping 645 may support beamforming (like spatial expansion), in which each vector of constellation points from all of the space-time streams is multiplied by a matrix of steering vectors to produce the input to the transmit chains.

Each TX chain 650 may prepare a plurality of OFDM symbols based on the constellation points. For example, the TX chain 650 may include an inverse discrete Fourier transform (IDFT) that converts a block of constellation points to a time domain block. The TX chain 650 may include a cyclic shift (CSD), guard interval inserter, and an analog front end to transmit OFDM symbols as radio frequency (RF) energy.

The transmitter apparatus 600 described in FIG. 6A is only one example of a transmitter apparatus. Other block diagrams may add or remove functional blocks.

Figure 6B:
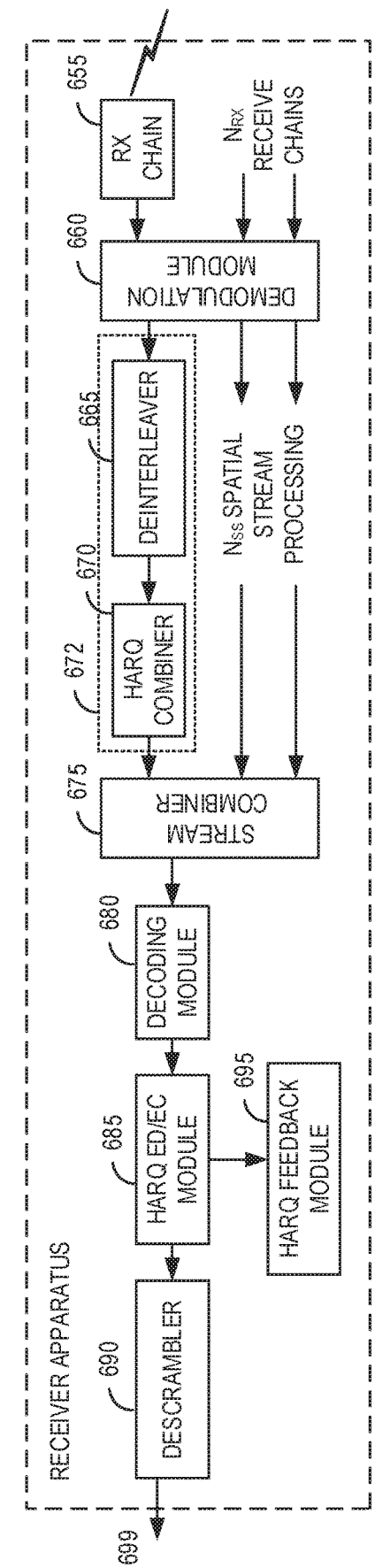
FIG. 6B depicts a block diagram of an example receiver apparatus for a receiving STA that supports a HARQ protocol.

FIG. 6B depicts a block diagram of an example receiver apparatus for a receiving STA that supports a HARQ protocol. The example receiver apparatus 601 shows some of the functional blocks in a receiving STA. The example receiver apparatus 601 is one of many possible designs for a receiver. In the example of FIG. 6B, RF energy may be received by an analog front end of a receive (RX) chain 655. For example, the RX chain 655 may include an antenna and automatic gain control (AGC) components (not shown). Furthermore, the RX chain 655 may include a fast Fourier transform (FFT) function to convert time domain symbols to a frequency domain representation of received data. $N_{RX}$ receive chains may prepare frequency domain representations of received data associated with each RX chain. Each spatial stream may be processed by a demodulation module 660. The demodulation module 66 may convert the frequency domain representations into a plurality of spatial streams. As a result, the demodulation module 660 may provide $N_{SS}$ spatial streams. An example of spatial stream processing 672 may include a deinterleaver 665 and a HARQ combiner 672. If BCC interleaver was used in the transmitter apparatus 600, the deinterleaver 665 may perform a de-interleaving of the bitstream to recover an original ordering of the bitstream. In some implementations, the spatial stream processing 672 may include a HARQ combiner 670 which combines a second HARQ transmission with a first HARQ transmission. The HARQ combiner 670 may use LLR calculations to recover a bit stream. In some implementations, the HARQ combiner may be located after a stream combiner 675. A stream combiner 675 may reverse the process of the stream parser 620 of the transmitter. For example, the stream combiner 675 may combine bitstreams from multiple spatial streams to prepare encoded data bits for a decoding module 680. The decoding module 680 may decode the encoded bits. In some implementations, the decoding module 680 may implement error correction using redundancy bits in the encoded bits. A HARQ error detection and error correction module 685 may use a HARQ process in coordination with the decoding module 680. For example, the HARQ error detection and error correction module 685 may attempt to correct errors in the decoded bits. A HARQ feedback module 695 may prepare a feedback message based on the HARQ protocol. A descrambler 690 may reverse the scrambling performed by the scrambler 610 and provide the data 699 to an upper layer of the receiving STA. Further options and examples regarding the descrambling are described in this disclosure.

Figure 7:
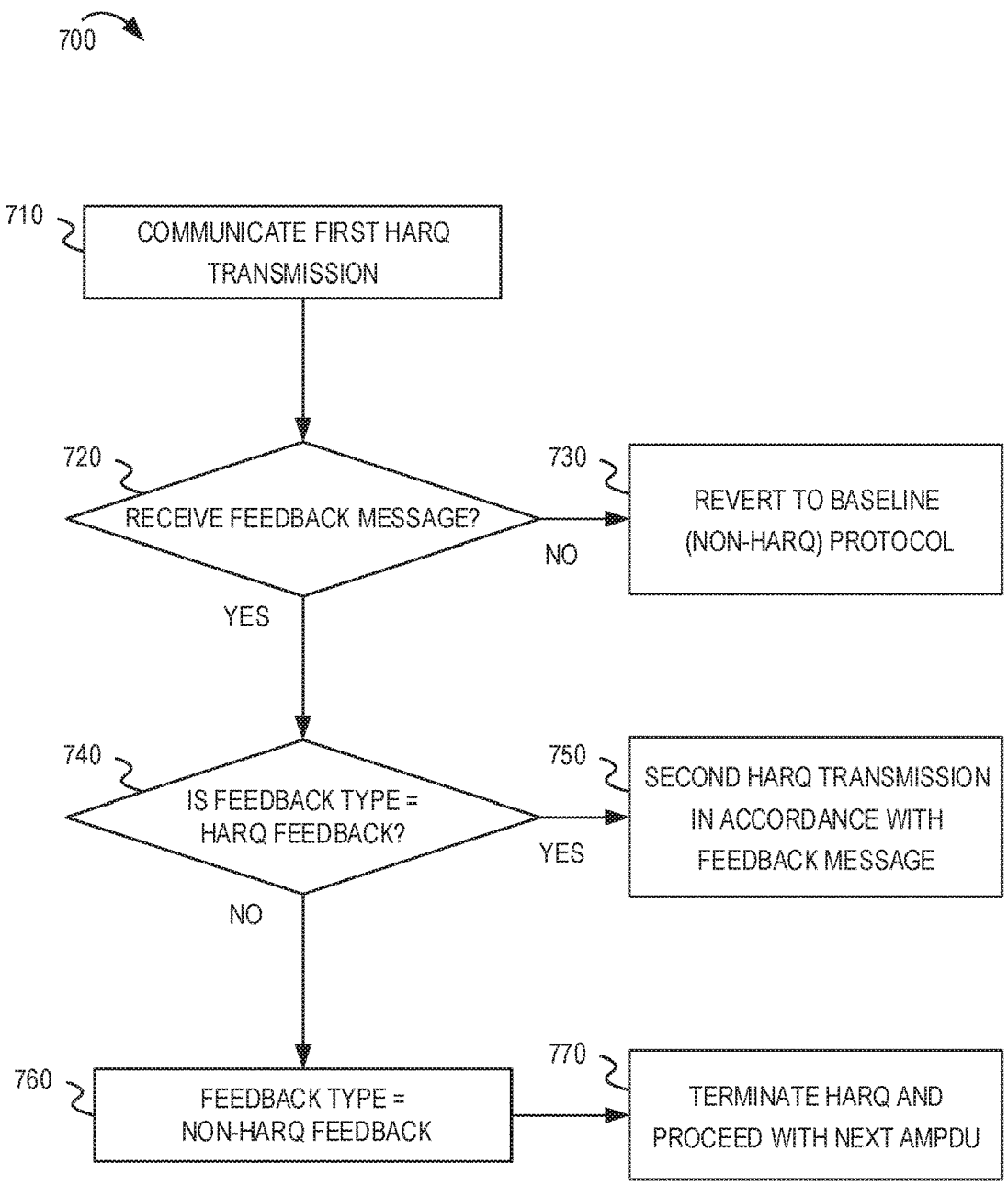
FIG. 7 depicts a flowchart with example operations for processing a feedback message in response to a HARQ transmission.

FIG. 7 depicts a flowchart with example operations for processing a feedback message in response to a HARQ transmission. The example operations may be performed by a first WLAN device (such as a sending STA). The flowchart 700 begins at block 710. At block 710, the first WLAN device may communicate a first HARQ transmission to the second WLAN device. For example, the first HARQ transmission may be formatted using the HARQ PPDU format described in FIG. 4.

At decision 720, the first WLAN device may determine if it has received a feedback message from the second WLAN device. If the first WLAN device did not receive a feedback message, the flowchart 700 proceeds to block 730. At block 730, the first WLAN device may determine that the HARQ transmission failed and may revert to a baseline (non-HARQ) protocol to retransmit the original data.

If, at decision 720, the first WLAN device has received a feedback message, the flowchart 700 proceeds to decision 740. At decision 740, the first WLAN device may determine whether the feedback message is a HARQ feedback type or a non-HARQ feedback type. If the feedback message is a HARQ feedback type, the flowchart 700 proceeds to block 750. At block 750, the first WLAN device may send the second HARQ transmission in accordance with the feedback message. For example, if the feedback message indicates a time segment, modulation order change, or sub-band bitmap, then the first WLAN device may send the second HARQ transmission using those parameters.

If, at decision 740, the feedback message is not a HARQ feedback type, the flowchart 700 proceeds to block 760. At block 760, the first WLAN device may determine that the feedback message has a non-HARQ feedback type (such as a traditional ACK/NACK or a Block ACK). At block 770, the first WLAN device may terminate the HARQ process and proceed with the next communication. For example, the next communication may be a next A-MPDU or traditional PPDU.

Figure 8:
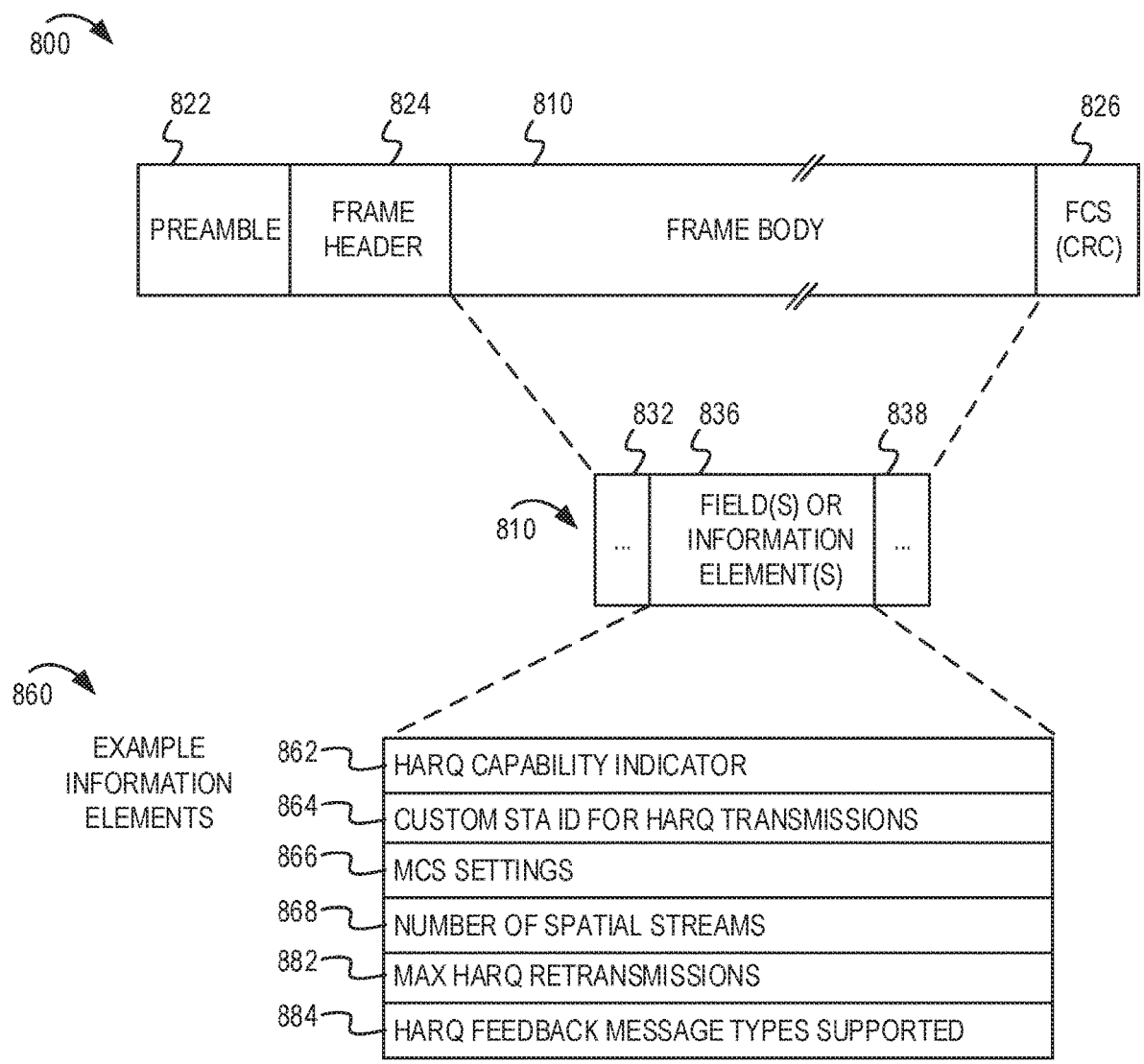
FIG. 8 depicts a conceptual diagram of an example configuration message for use in a HARQ protocol.

FIG. 8 depicts a conceptual diagram of an example configuration message for use in a HARQ protocol. For example, the example message 800 may be sent from a first WLAN device to a second WLAN device, or vice versa. The example message 800 may include a preamble 822, a header 824, a payload 810, and a frame check sequence (FCS) 826. The preamble 822 may include one or more bits to establish synchronization. The preamble 822 may be used, for example, when a dedicated discovery channel uses a listen-before-talk, contention-based access, or carrier sense access. In some implementations, if the dedicated discovery channel uses a scheduled timeslot for transmission, the preamble 822 may be omitted. The header 824 may include source and destination network addresses (such as the network address of the sending AP and receiving AP, respectively), the length of data frame, or other frame control information. In some implementations, the header 824 also may indicate a technology type associated with a technology-specific payload (if the payload 810 is specific to a particular technology type or types). The payload 810 may be used to convey the HARQ protocol parameters. The HARQ protocol parameters may be organized or formatted in a variety of ways. The payload 810 may be organized with a message format and may include information elements 832, 836, and 838. Several examples of information elements are illustrated in FIG. 8.

Example information elements 860 may be sent as part of a HARQ configuration or setup message. The example information elements 860 may include initial (default) parameters for a HARQ process. In some implementations, the example information elements 860 may include a HARQ capability indicator 862 to indicate that the STA supports the HARQ features in this disclosure. The example information elements 860 may include a custom STA ID for HARQ transmissions 864, one or more MCS settings 866, a number of spatial streams 868 to use for HARQ transmissions, a maximum number of HARQ retransmissions 882, an indication of the HARQ feedback message types supported 884, or any combination thereof.

A communication standard may support a variety of HARQ capability information signaling. For example, an indicator may be used to enable or disable a HARQ capability, the type of HARQ (such as Chase combining (CC), punctured Chase combining (PCC), incremental redundancy (IR), or any combination of these), or an LLR buffer size (number of coded bits to store their LLRs), among other examples. The capability information may be static type, such as when the HARQ capability may be mutually exchanged between AP and STA when a STA is associated to its AP. Alternatively, or additionally, the capability information may be semi-static type, such that some of the HARQ capability info (such as HARQ enabler, or type of HARQ) may be changed and signaled in some transmissions and be valid for a period of time.

The type of HARQ capability information to be signaled may depend on whether the HARQ features are mandatory or optional in a communication standards specification (such as 802.11be). For example, if HARQ is a mandatory feature, the STAs may have LLR buffers dedicated for HARQ combining. The communication standard may define one or more types of HARQ (such as Chase combining (CC), punctured Chase combining (PCC), or IR-HARQ, or a combination of these) and one or more supported LLR buffer sizes. If only one type or a fixed LLR buffer size is mandated, then no signaling may be needed to indicate the type of HARQ or the size of the LLR buffer. If the communication standard permits different types of HARQ or different LLR buffer sizes, then signaling may be used to indicate the type of HARQ, the LLR buffer size, or both. If HARQ is an optional feature in the communication standard, then a STA also may signal whether it supports HARQ and whether or not to enable the HARQ procedures described herein.

HARQ capability can be signaled in many ways. For example, if enablement or disablement is signaled, a single bit may be used for such signaling. Depending on the types of HARQ that are mandatory or optional in the communication standard, various numbers of bits may be used to indicate the type of HARQ. For example, a single bit can be used to signal 2 choices: 0-CC/1-IR, or 0-CC only/1-both CC & IR. In another example, two bits can be used to signal 3 choices: CC only, IR only, both CC & IR. In some examples, the HARQ capability information may include 1 bit for HARQ capability and another 1-2 bits for type of HARQ. It may be possible to use 2 bits for 4 combinations (disabled/CC only/IR only/both). To signal HARQ capability and LLR buffer size, 1 bit can be used to signal the HARQ capability and a few bits for LLR buffer size. Alternatively, only the LLR buffer size may be signaled and a value of "0" may indicate that HARQ disabled or the STA is incapable of using HARQ. To signal both the type of HARQ and LLR buffer size, the signaling may use 1-2 bits to signal type of HARQ and use a few bits to signal LLR buffer size. To signal HARQ capability, LLR buffer size, and type of HARQ, a bit field may include one or more bits for each item.

Figure 9:
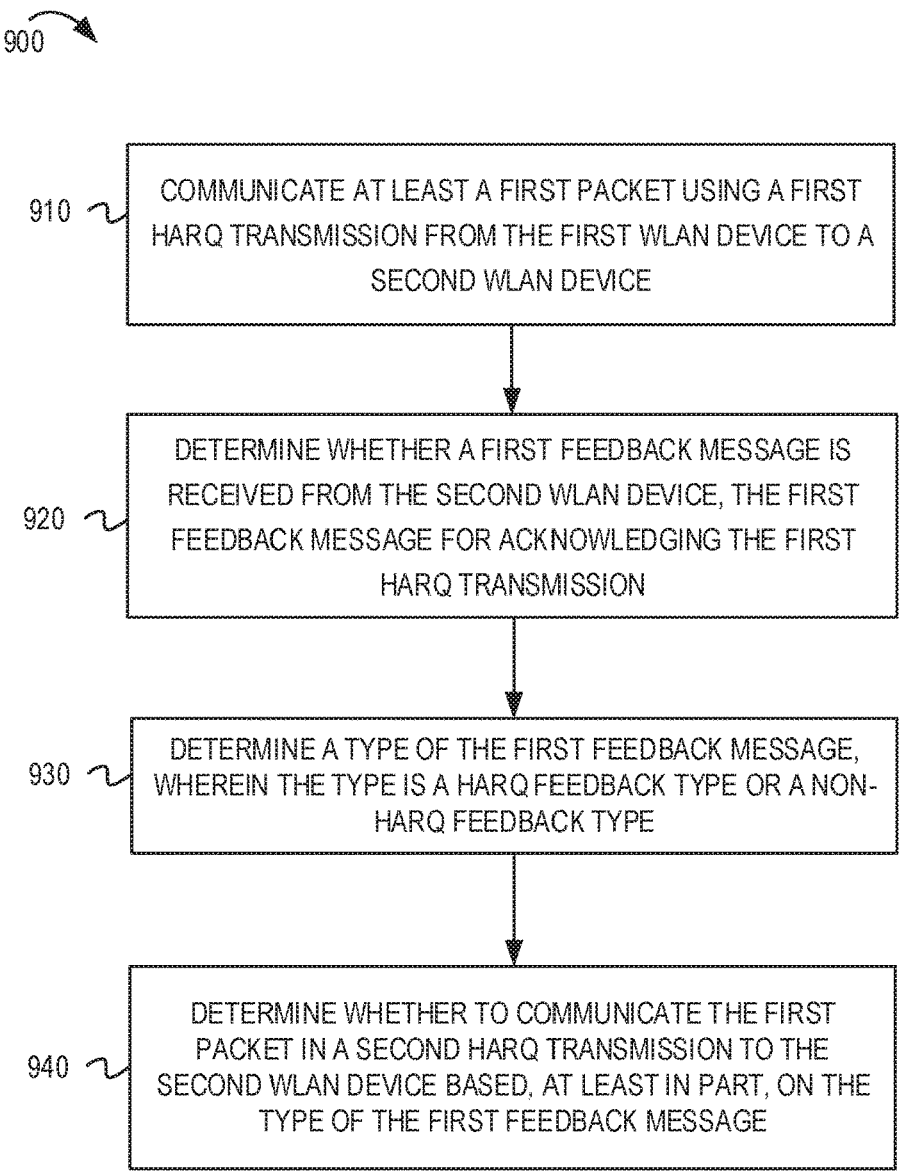
FIG. 9 depicts a flowchart with example operations for a sending STA.

FIG. 9 depicts a flowchart with example operations for a sending STA. The example operations may be performed by a first WLAN device (such as a sending STA). The flowchart 900 begins at block 910. At block 910, the first WLAN device may communicate at least a first packet using a first HARQ transmission from the first WLAN device to a second WLAN device. In some implementations, the first HARQ transmission may include multiple MPDUs encoded into the first HARQ transmission.

At block 920, the first WLAN device may determine whether a first feedback message is received from the second WLAN device. The first feedback message may be an acknowledgment or a NACK of the first HARQ transmission. If the first feedback message is received, the flowchart 900 may proceed to block 930. Otherwise, the first WLAN device may terminate the HARQ process and revert to a baseline retransmission approach.

At block 930, the first WLAN device may determine a type of the first feedback message. The type may be a HARQ feedback type or a non-HARQ feedback type. At block 940, the first WLAN device may determine whether to communicate the first packet in a second HARQ transmission to the second WLAN device based, at least in part, on the type of the first feedback message. For example, the first WLAN device may perform operations similar to those described in FIG. 7.

Figure 10:
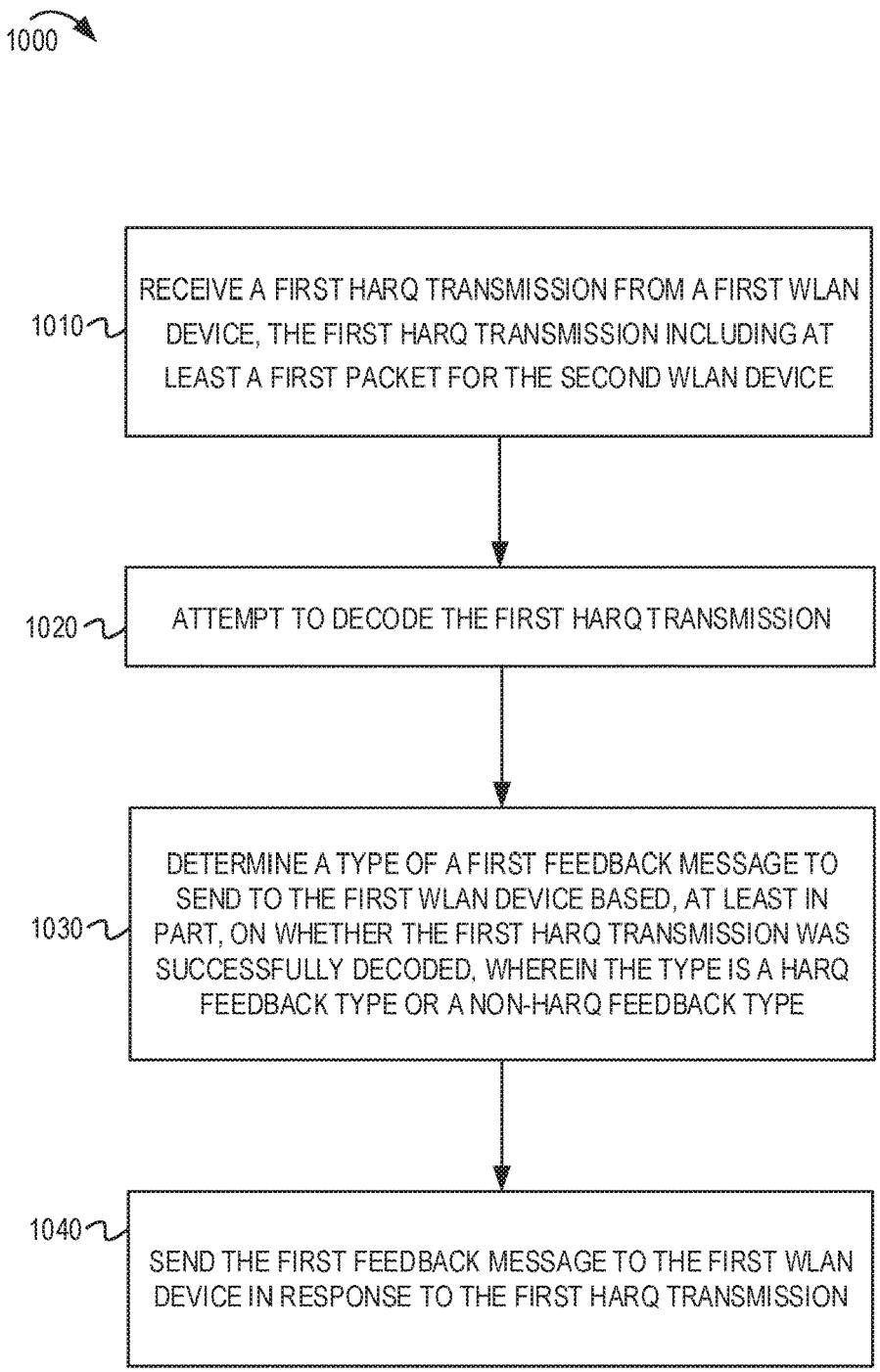
FIG. 10 depicts a flowchart with example operations for a receiving STA.

FIG. 10 depicts a flowchart with example operations for a receiving STA. The example operations may be performed by a second WLAN device (such as a receiving STA) in a HARQ process with a first WLAN device. The flowchart 1000 begins at block 1010. At block 1010, the second WLAN device may receive a first HARQ transmission from the first WLAN device. The first HARQ transmission may include at least a first packet for the second WLAN device. At block 1020, the second WLAN device may attempt to decode the first HARQ transmission. For example, the second WLAN device may attempt to recover one or more MPDUs from the first HARQ transmission.

At block 1030, the second WLAN device may determine a type of a first feedback message to send to the first WLAN device based, at least in part, on whether the first HARQ transmission was successfully decoded. The type of the first feedback message may be a HARQ feedback type or a non-HARQ feedback type. For example, if all or most of the MPDUs in the first HARQ transmission were successfully decoded, the second WLAN device may send a non-HARQ feedback message to indicate a positive acknowledgment and to end the HARQ process. If some of the MPDUs were not successfully decoded, the second WLAN device may still determine to send a non-HARQ feedback message (such as a Block ACK feedback) to indicate which MPDUs to retransmit using a non-HARQ transmission. Otherwise, if the first HARQ transmission was not successfully decoded, the first WLAN device may send a HARQ feedback message type to cause the first WLAN device to send a second HARQ transmission.

At block 1040, the second WLAN device may send the first feedback message to the first WLAN device in response to the first HARQ transmission.

Figure 11:
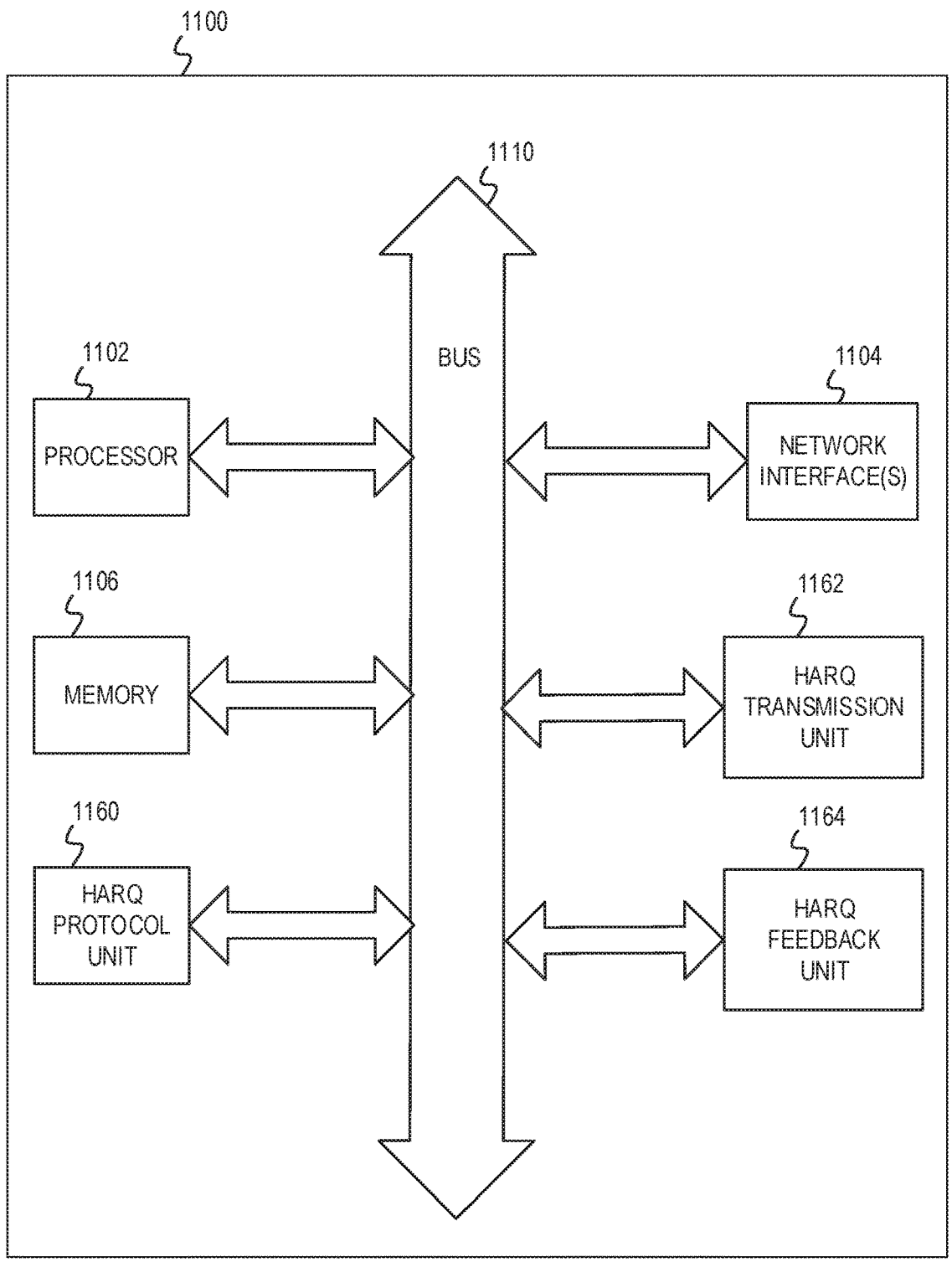
FIG. 11 shows a block diagram of an example electronic device.

FIG. 11 shows a block diagram of an example electronic device. In some implementations, the electronic device 1100 may be one of an access point (including any of the APs described herein), a range extender, or other electronic systems. The electronic device 1100 can include a processor 1102 (possibly including multiple processors, multiple cores, multiple nodes, or implementing multi-threading, etc.). The electronic device 1100 also can include a memory 1106. The memory 1106 may be system memory or any one or more of the possible realizations of computer-readable media described herein. The electronic device 1100 also can include a bus 1110 (such as PCI, ISA, PCI-Express, Hyper-Transport®, InfiniBand®, NuBus,® AHB, AXI, etc.), and a network interface 1104 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 1100 may support multiple network interfaces—each of which is configured to couple the electronic device 1100 to a different communication network.

The electronic device 1100 may include HARQ protocol unit 1160, a HARQ transmission unit 1162, and a HARQ feedback unit 1164. In some implementations, the HARQ protocol unit 1160, the HARQ transmission unit 1162, and the HARQ feedback unit 1164 may be distributed within the processor 1102, the memory 1106, and the bus 1110. The HARQ protocol unit 1160, the HARQ transmission unit 1162, and the HARQ feedback unit 1164 can perform some or all the operations described herein. For example, the HARQ protocol unit 1160 may be similar to the HARQ protocol unit 112 or the HARQ protocol unit 122 as described in FIG. 1. The HARQ transmission unit 1162 may be similar to the HARQ transmission unit 114 described in FIG. 1. The HARQ feedback unit 1164 may be similar to the HARQ feedback unit 124 described in FIG. 1. Depending on whether the electronic device 1100 is a sending STA or a receiving STA for a HARQ process, the electronic device 1100 may use either of the HARQ transmission unit 1162 or the HARQ feedback unit 1164 to perform the features described in this disclosure.

The memory 1106 can include computer instructions executable by the processor 1102 to implement the functionality of the implementations described in FIGS. 1-10. Any of these functionalities may be partially (or entirely) implemented in hardware or on the processor 1102. For example, the functionality may be implemented with an application specific integrated circuit, in logic implemented in the processor 1102, in a co-processor on a peripheral device or card, etc. Further, realizations may include fewer or additional components not illustrated in FIG. 11 (such as video cards, audio cards, additional network interfaces, peripheral devices, etc.). The processor 1102, the memory 1106, and the network interface 1104 are coupled to the bus 1110. Although illustrated as being coupled to the bus 1110, the memory 1106 may be coupled to the processor 1102.

Figure 12A:
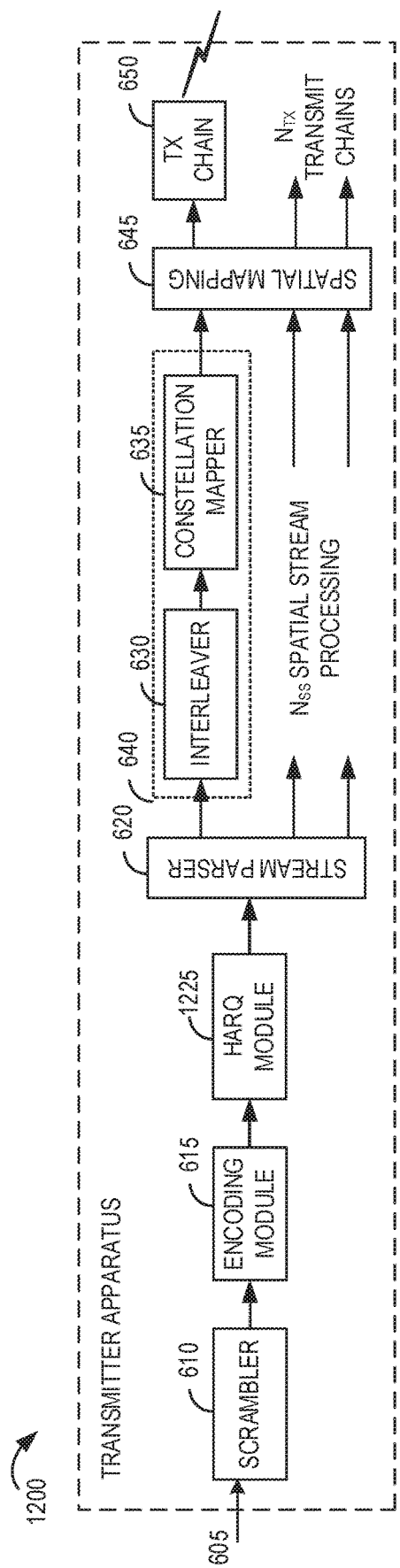
FIG. 12A depicts a block diagram of another example transmitter apparatus for a sending STA that supports a HARQ protocol.

FIG. 12A depicts a block diagram of another example transmitter apparatus for a sending STA that supports a HARQ protocol. The example transmitter apparatus 1200 shows some of the functional blocks in a sending STA. In FIG. 12A, the example transmitter apparatus 1200 may support BCC or LDPC encoding. When using partial retransmission (such as incremental redundancy), the retransmitted coded bits (in the second HARQ transmission) generated from same source data may not be in the "same" stream as the original coded bits in the first HARQ transmission. The features in FIG. 12A are similar to those described in FIG. 6A, except that the HARQ module 1225 may be used to perform HARQ encoding or retransmission before the stream parser 620. Doing so may enable the transmitter apparatus to use different quantities of spatial streams for the second HARQ transmission than were used in the first HARQ transmission.

Figure 12B:
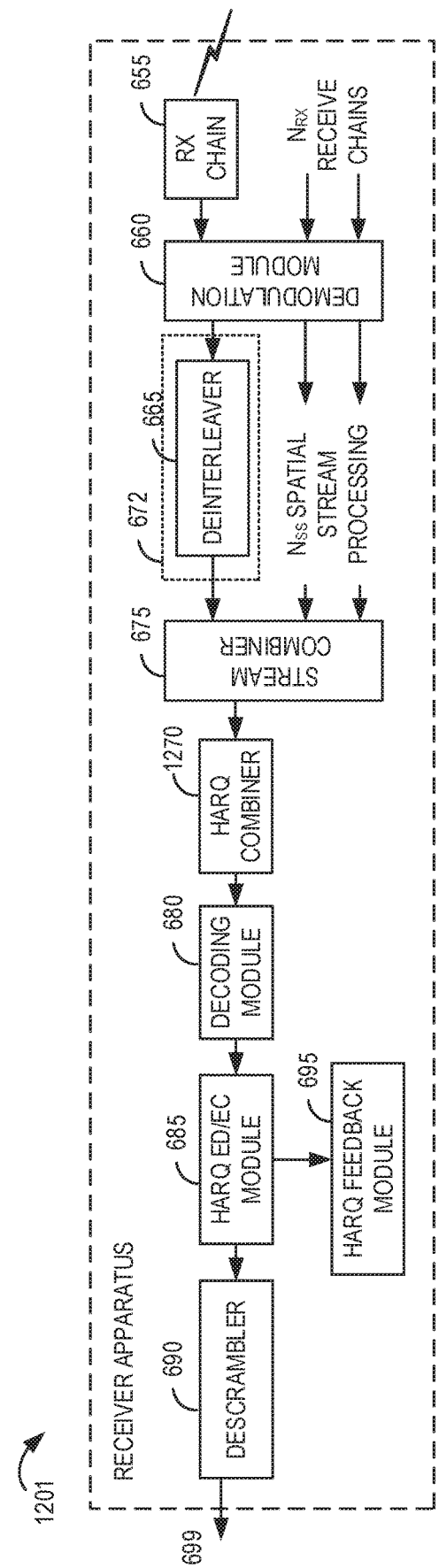
FIG. 12B depicts a block diagram of another example receiver apparatus for a receiving STA that supports a HARQ protocol.

FIG. 12B depicts a block diagram of an example receiver apparatus for a receiving STA that supports a HARQ protocol. The example receiver apparatus 1201 shows some of the functional blocks in a receiving STA. The features in FIG. 12B are similar to those described in FIG. 6B, except that the HARQ module 1270 may be used to perform HARQ processing after the stream combiner 675. FIG. 12B supports a HARQ process that corresponds to the transmitter apparatus described in FIG. 12A.

Figure 13A:
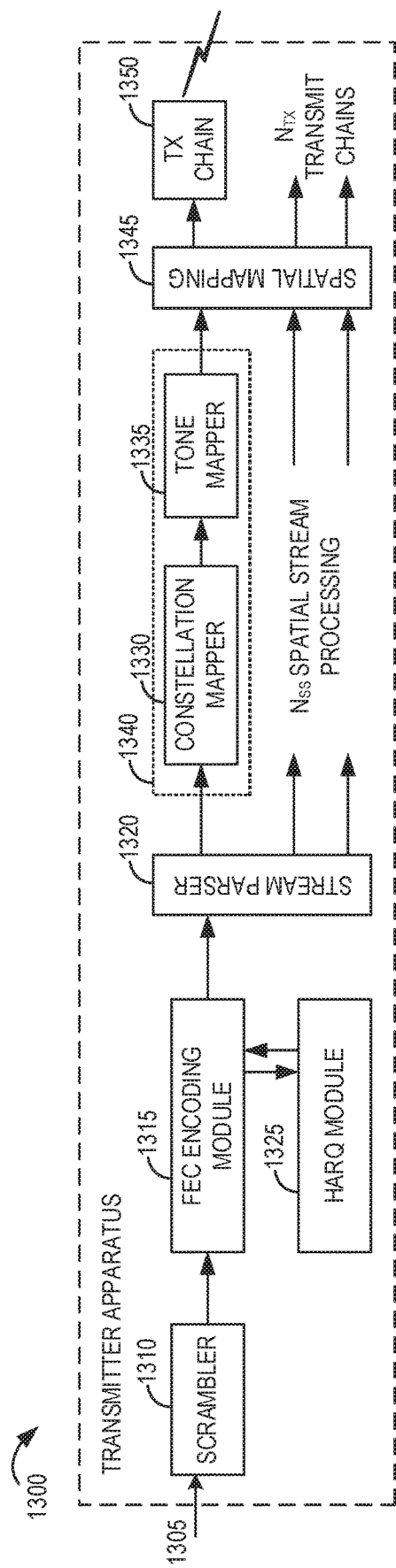
FIG. 13A depicts a block diagram of an example transmitter apparatus for a sending STA that supports an example HARQ protocol with low density parity check (LDPC) encoding.

FIG. 13A depicts a block diagram of an example transmitter apparatus for a sending STA that supports an example HARQ protocol. The example transmitter apparatus 1300 shows some of the functional blocks in a sending STA. The example transmitter apparatus 1300 is one of many designs for a transmitter. In FIG. 13A, the example transmitter apparatus 1300 is designed for LDPC encoding. In the design described in FIG. 13A, source data 1305 may be processed by a scrambler 1310 and an FEC encoding module 1315. The scrambler 1310 may scramble the source data 1305 to reduce the probability of long sequences of zeros or ones. The FEC encoding module 1315 may perform encoding for error correction and error detection. For example, the FEC encoding module 1315 may perform FEC and add redundancy or CRC bits to the source data. A HARQ module 1325 may maintain a mapping between the scrambled source data and the output of the FEC encoding module 1315. Furthermore, the HARQ module 1325 may store the codeword, punctured parity bits, or other information generated by the FEC encoding module 1315. The encoded data may be sent to a stream parser 1320 that divides the encoded data into $N_{SS}$ spatial streams. In some implementations, there may only be one spatial stream and the stream parser 1320 may be unused. An example of spatial stream processing 1340 may include a constellation mapper 1330 and a tone mapper 1335. The constellation mapper 1330 maps the sequence of bits in each spatial stream to constellation points (complex numbers). The constellation mapper 1330 may perform the modulation of the bits based on an MCS that defines the constellation points. The tone mapper 1335 may translate the output from the constellation mapper 1330 to the frequencies used for the transmission.

After the spatial streams are processed, a spatial mapping 1345 may map space-time streams to $N_{TX}$ transmit chains (including TX chain 1350). There may be different ways of mapping the streams to transmit chains. For example, in a direct mapping the constellation points from each space-time stream may be mapped directly onto the transmit chains (one-to-one mapping). Another example may use spatial expansion, in which vectors of constellation points from all the space-time streams are expanded via matrix multiplication to produce the input to all of the transmit chains. The spatial mapping 1345 may support beamforming (like spatial expansion), in which each vector of constellation points from all of the space-time streams is multiplied by a matrix of steering vectors to produce the input to the transmit chains.

Each TX chain 1350 may prepare a plurality of OFDM symbols based on the constellation points. For example, the TX chain 1350 may include an inverse discrete Fourier transform (IDFT) that converts a block of constellation points to a time domain block. The TX chain 1350 may include a cyclic shift (CSD), guard interval inserter, and an analog front end to transmit OFDM symbols as radio frequency (RF) energy.

The transmitter apparatus 1300 described in FIG. 13A is only one example of a transmitter apparatus. Other block diagrams may add or remove functional blocks.

Figure 13B:
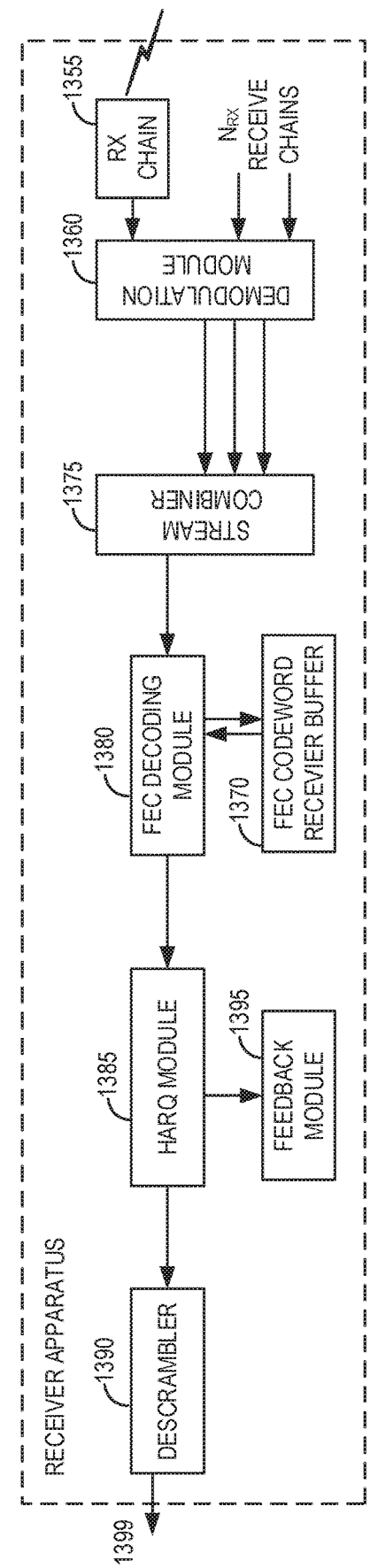
FIG. 13B depicts a block diagram of an example receiver apparatus for a receiving STA that supports an example HARQ protocol with LDPC encoding.

FIG. 13B depicts a block diagram of an example receiver apparatus for a receiving STA that supports an example retransmission protocol. The example receiver apparatus 1301 shows some of the functional blocks in a receiving STA. The example receiver apparatus 1301 is one of many possible designs for a receiver. In the example of FIG. 13B, RF energy may be received by an analog front end of a receive (RX) chain 1355. For example, the RX chain 1355 may include an antenna and automatic gain control (AGC) components (not shown). Furthermore, the RX chain 1355 may include a fast Fourier transform (FFT) function to convert time domain symbols to a frequency domain representation of received data. $N_{RX}$ receive chains may prepare frequency domain representations of received data associated with each RX chain. Each spatial stream may be processed by a demodulation module 1360. The demodulation module 1360 may convert the frequency domain representations into a plurality of spatial streams. As a result, the demodulation module 1360 may provide $N_{SS}$ spatial streams. A stream combiner 1375 may reverse the process of the stream parser 1320 of the transmitter. For example, the stream combiner 1375 may combine bitstreams from multiple spatial streams to prepare encoded data bits for a decoding module 1380. The decoding module 1380 may decode the encoded bits. In some implementations, the decoding module 1380 may implement error correction using redundancy bits in the encoded bits. An FEC codeword receiver buffer 1370 may store a previous FEC codeword for subsequent use if the decoding module 1380 does not successfully decode the codeword. After receiving additional parity bits, the decoding module 1380 may obtain the stored FEC codeword from the FEC codeword receiver buffer 1370 and reattempt to decode it using the additional parity bits. A HARQ module 1385 may coordinate with the decoding module 1380 to implement the retransmission protocol. For example, the HARQ module 1385 may configure the decoding module 1380 for use with additional parity bits and may negotiate the retransmission protocol parameters with the sending STA. A feedback module 1395 may prepare a feedback message based on the retransmission protocol. A descrambler 1390 may reverse the scrambling performed by the scrambler 1310 and provide the data 1399 to an upper layer of the receiving STA.

The examples in this disclosure are meant to aid a person of skill in the art to understand the nature of the implementations. Variations of the described examples are possible. An example of additional variations include potential signaling options in the first HARQ transmission, feedback message, and second HARQ transmission based on CQI feedback. Another example variation includes the reduction of data or non-essential signaling from a second HARQ transmission. Yet another example variation includes the use of a MAC like acknowledgment using a PHY process.

LLR Encoding and LLR Buffer Size

FIG. 14 includes a table showing examples how LLR encoding and buffer size may be used with a HARQ protocol. The LLR buffer size is the number of log-likelihood ratios of coded bits that can be stored by a receiving STA and used with LLR combining to decode a packet after a HARQ retransmission. The LLR buffer size may be denoted as llr_buff_num_bit. There may be various options available for a receiving STA to indicate the LLR buffer size to the sending STA. For example, signaling may use the following options:

Option 1: Signal llr_buff_num_bit in the unit of bits

Option 2: Signal llr_buff_num_per_unit where llr_buff_num_bit=llr_buff_num_unit×num_bit_per_unit, and the choice of unit size may include but not limited to the following examples Option 2a: Signal llr_buff_num_byte in the unit of bytes (for example, llr_buff_num_bit=8*llr_buff_num_byte)

Option 2b: Signal llr_buff_num_cw_648 in the unit of number of LDPC codeword size of 648 bits (for example, llr_buff_num_bit=648*llr_buff_num_cw_648)

Option 2c: Signal llr_buff_num_cw_1296 in the unit of number of LDPC codeword size of 1296 bits (for example llr_buff_num_bit=1296*llr_buff_num_cw_1296)

Option 2d: Signal llr_buff_num_cw_1944 in the unit of number of LDPC codeword size of 1944 bits (for example, llr_buff_num_bit=1944*llr_buff_num_cw_1944)

The number of bits needed to signal the LLR buffer size may depend on the maximum number of MPDUs, maximum MPDU size, and signaling option. For example, the max payload may be calculated (max_payload_bit=max_mpdu_size_bytes*8*max_num_mpdu) and the LLR buffer size may be based on the max payload (llr_buff_num_bit=max_payload_bit/lowest_code_rate). FIG. 14 shows a table 1400 with examples of the LLR buffer size values based on the above options and calculations.

Scrambling Options

In some implementations, scrambling used for a second HARQ transmission may be same as used, so that combining can happen without descrambling. For the first HARQ transmission, the scrambling seed/state may be generated at sending STA. The receiving STA may determine the scrambling seed/state in a variety of ways and store the scrambling seed/state for use with the second HARQ transmission if needed. For example, the scrambling seed/state can be obtained from a service field. Alternatively, the sending STA may signal the scrambling seed/state to the receiving STA using a few bits in a signal field (such as SIG).

The scrambling seed/state may be used in the generation of the second HARQ transmission. Note that in case of partial transmission of failed portions (such as MPDU, segment, or CWG, etc.) of the previous packet, a subset of the payload bits may be used to generate coded bits. Thus, the scrambling in different failed portions come from different portions in the scrambling sequence. Therefore, the scrambling step before encoding may need modification to support coordination between the sending STA and the receiving STA. In a first option, the sending STA may store the scrambling sequence for the first HARQ transmission and apply the corresponding scrambling sub-sequence for each portion when generating generate coded bits for the second HARQ transmission. In a second option, the sending STA may use the mother code to generate and store mother codewords for the first HARQ transmission, so that another punctured version (based on the original mother codewords) of failed portions may be used in the second HARQ transmission.

The second HARQ transmission may or may not include a service field to indicate the scrambling seed/state. For example, the sending STA may use same first two bytes as in first HARQ transmission to carry same scrambling seed/state for combining purpose. Alternatively, if the scrambling seed/state has been reliably signaled in the first HARQ transmission, some or all of the service field may be omitted in the second HARQ transmission. When the service field is included in the first HARQ transmission and the second HARQ transmission, the receiving STA may obtain the scrambling seed/state from service field in both transmissions, and combine the scrambling state between first HARQ transmission and the second HARQ transmission. Otherwise, if the scrambling seed/state is signaled in first HARQ transmission, receiving STA may store it and reuse it for processing the second HARQ transmission.

Further Details Regarding Feedback Messages

As described in this disclosure, there may be different types of feedback packets, including PHY layer, MAC layer, and MAC-like layer (in PHY) which can be used to provide HARQ feedback. Below are several options and details regarding formats and signaling for some example feedback message types.

Examples for Formatting PHY HARQ ACK Feedback Packet

A PHY HARQ ACK feedback may be formatted according to various communication protocols, such as IEEE 802.11a, 802.11n, 802.11ac, 802.11ax, 802.11be, etc.

Option A: 802.11a packet format
20 MHz (48 data tones) & duplicate every 20 MHz
Only 1 spatial stream (ss). Extra Tx antennas provide power gain
The HARQ ACK bitmap may be put in 11a OFDM data symbols Option B: 802.11n/802.11ac packet format
Up to 40 MHz in 802.11n, or up to 160/80+80 MHz in 11ac, duplicate to occupy entire channel bandwidth
Up to 4ss in 802.11n, or up to 8ss in 802.11ac. Extra Tx antennas provide power gain
Higher tone plan efficiency (52, 108, 234 & 468 data tones for 20, 40, 80 & 160/80+80 MHz)
The HARQ ACK bitmap may be put in 802.11n/802.11ac OFDM data symbols
At least 16 us (802.11n) & 20 us (802.11ac) extra preamble overhead over option A Option C: 802.11ax/802.11be packet format
Up to 160 MHz BW in 802.11ax, or up to 320 MHz in EHT
Up to 8ss in 802.11ax, or up to 16ss in EHT. Extra Tx antennas leads to power gain
Slightly higher tone plan efficiency compared to options A & B
The HARQ ACK bitmap may be put in 802.11ax/EHT OFDMA data symbols that can support multiple users
May use much larger preamble overhead over options A & B MCS Selection Note that the data PPDU may be using BCC or LDPC encoding, while the ACK/BlockACK may use BCC. BCC performance for an MCS may be worse than LDPC for the same MCS. Therefore, ACK/BlockACK may need more reliable MCS, compared to the MCS used in data PPDU. The following describes some alternative examples for determining an MCS to use for the ACK/BlockACK feedback message.

Option a: use most reliable MCS0 (BPSK, rate 1/2).
Option b: use a relative reliable MCS that has around half of the data rate of the data PPDU. The lowest MCS is capped at MCS0 (BPSK, rate 1/2) and the highest MCS is capped at the highest MCS of the first HARQ transmission.

Figure 15:
FIG. 15 shows a table with example modulation and coding scheme (MCS) options for a HARQ feedback message based on current MCS rules.

Option c: use current MCS rules for ACK/BlockACK. FIG. 15 shows a table 1500 showing this option.
If data PPDU uses BPSK, ACK/BlockACK uses MCS0 (BPSK, rate 1/2, 6 Mbps)
If data PPDU uses QPSK, ACK/BlockACK uses MCS1 (QPSK, rate 1/2, 12 Mbps)
If data PPDU uses 16QAM or above, ACK/BlockACK uses MCS3 (16QAM, rate 1/2, 24 Mbps)

Option d: use the lower max MCS, i.e., the highest MCS that has a lower data rate than the MCS in first HARQ transmission. If the first HARQ transmission uses MCS0 (BPSK, rate 1/2), ACK/BlockACK also uses MCS0. FIG. 16 shows a table 1600 showing this option.

Option e: use a relatively reliable MCS that is around 3 dB down in packet error rate (PER) performance. The lowest MCS is capped at MCS0 (BPSK, rate 1/2) and the highest MCS is capped at the highest MCS of the first HARQ transmission. The performance depends on PPDU format, channel, BW, coding, $N_{SS}$, GI, receiver, or the like. FIG. 17 shows a table 1700 showing this option. Not that the last column of MCS selection includes theoretical values based on expected results (bold-italics indicated).

Option e: use a relatively reliable MCS that is around 3 dB down in PER performance. FIG. 18 shows a table 1800 showing this option and is based on the values for MCS performance from FIG. 17.

Examples for Formatting MAC or MAC-Like HARQ ACK Feedback Packet

A MAC HARQ ACK (or MAC-like HARQ ACK) feedback may be formatted according to various example options.

Option A: Use a PHY packet format similar to the PHY HARQ ACK without MAC header. May use a relatively reliable MCS that is around 3 dB down in PER performance.

Option B: Use 802.11ax like MAC BlockAck format
Payload size=MAC 26 bytes+n bytes bitmap+service field 2 bytes+6 tail bits
Assume additional 2 bytes in header
May add 1 bit to signal that this is a HARQ BlockAck
May add info of the feedback type, and/or granularity, and/or BA bitmap size
The BA bitmap size (n bytes) may be a variable
This option may use relatively reliable MCS that is around 3 dB down in PER performance or may use the current MCS rules for BlockAck. Under current MCS rules, if the first HARQ transmission uses BPSK, the ACK/BlockACK would use MCS0 (BPSK, rate 1/2, 6 Mbps). If the first HARQ transmission uses QPSK, the ACK/BlockACK would use MCS1 (QPSK, rate 1/2, 12 Mbps). If the first HARQ transmission uses 16QAM or above, the ACK/BlockACK would use MCS3 (16QAM, rate 1/2, 24 Mbps)
Feedback duration (including 2 SIFSs) as function of BA bitmap size (from 8 bits to 1024 bits). FIG. 19 shows a table 1900 with the feedback duration in relation to the MCS and BA Bitmap size.

ACK/BlockAck Packet Duration for Legacy STAs

IEEE 802.11ax devices currently, only use non-HT format for BlockAck except for an AP's multi-STA BlockACK, which allows HT/VHT formats. The overhead includes a legacy preamble of 20 μs and the data portion. Table 3 shows the duration based on Block Ack size.

TABLE 3

|  | ACK | BlockACK (8 bytes bitmap) |
|---|---|---|
| MCS0 | 24 us = 6 sym = 18 bytes | 48 us = 12 sym = 36 bytes |
| MCS1 | 12 us = 3 sym = 18 bytes | 24 us = 6 sym = 36 bytes |
| MCS3 | 8 us = 2 sym = 24 bytes | 12 us = 3 sym = 36 bytes |

In some implementations, an ACK Frame may include a MAC wrapper (header and FCS) of 14 bytes+service field 2 bytes+6 tail bits. For a MAC BlockAck frame, it may be possible to use a compressed bitmap. For example, the MAC BlockAck includes a MAC wrapper of 24 bytes+8 bytes bitmap (64 MPDUs)+service field 2 bytes+6 tail bits. 11ax may support a larger bit map of 32 bytes (to indicate 256 MPDUs). 11ay may support an even larger bit map of 128 bytes (to indicate 1024 MPDUs). As described above, these bit maps also can be used to provide codeword-based, CWG based, or time-segment based feedback.

FIG. 20 shows tables with feedback duration using a legacy communication protocol and various MCSs. A first table 2010 shows feedback duration for a data portion using 802.11ax or 802.11ay and various MCSs. A second table 2020 shows total feedback duration.

CQI Feedback Related Processing

In some implementations, CQI based feedback may be used following a first HARQ transmission. The CQI feedback from receiving STA to sending STA after initial transmission may be used for rate adaptation (adjusting the MCS) of the second HARQ transmission, for determining portions to retransmit, or both. In some implementations, the sub-band CQI feedback can indicate channel quality of sub-bands. The sub-band CQI may be used to determine quality (such as signal-to-noise ratio (SNR)) of different sub-bands, which in turn can be used to determine certain codewords (or bits) were received successfully or not. For example, if a codeword spreads across sub-bands that all have high enough SNR, it may be considered received successfully. If a codeword spreads across sub-bands that a majority of them have low SNR, it may be considered as not received successfully. If a codeword spreads across sub-bands some having high enough SNR while others having low SNR, it may need partial retransmission. Furthermore, the CQI feedback may be used by the sending STA to adjust transmission scheme in for the second HARQ transmission, such as boosting powers in certain sub-bands, nulling out certain sub-bands that have low SNR, or the like.

A property of the CQI feedback is that the needed number of feedback scales with BW but not time. The CQI feedback may describe the correlation of a channel within the same sub-bands in time. The CQI feedback can include feedback regarding different spatial streams in each sub-band, and the sub-band granularity may be configurable. For example, the granularity of the CQI feedback may be determined by the first HARQ transmission or by the receiving STA.

The receiving STA or the sending STA may use different processing based on the type and values of the CQI feedback. For example, the sub-band CQI feedback can indicate channel quality of sub-bands and be used by the sending STA to determine the transmit quality (such as SNR) of different sub-bands, thus, figuring out if certain codewords (or bits) being received successfully or not. Codewords not received successfully may need retransmission in HARQ. Bits originally transmitted in sub-bands with bad channel quality can be retransmitted in the HARQ retransmission. Alternatively, all codewords can be retransmitted using the same coding rate (and same code), but higher QAM modulation. In another example, in the second HARQ transmission, some subbands may be nulled and some sub-bands may load data. For example, good sub-bands (which have positive channel quality indicators) may include data while bad sub-bands (which have negative channel quality indicators) may be nulled. Power can be spread among good sub-bands and be higher than the case when spreading across all sub-bands. In yet another example, in the second HARQ transmission, all available sub-bands can be used for the retransmission. Power allocation to sub-bands can be adjusted such that power is boosted in bad sub-bands to compensate for low SNR.

The Figures and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by a first wireless local area network (WLAN) device for implementing a hybrid automatic repeat request (HARQ) protocol, comprising:
   communicating at least a first packet using a first HARQ transmission from the first WLAN device to a second WLAN device;
   receiving, from the second WLAN device, a first feedback message for acknowledging the first HARQ transmission, wherein a type of the first feedback message is a HARQ feedback type or a non-HARQ feedback type; and
   determining whether to communicate the first packet in a second HARQ transmission to the second WLAN device based, at least in part, on the type of the first feedback message from the second WLAN device.

2. The method of claim 1, further comprising:
   determining that the type of the first feedback message is the non-HARQ feedback type; and
   terminating a HARQ process between the first WLAN device and the second WLAN device in response to the determination that the type of the first feedback message is the non-HARQ feedback type.

3. The method of claim 1, further comprising:
   refraining from communicating the second HARQ transmission if the first feedback message indicates a positive acknowledgment of the first HARQ transmission; and
   communicating the second HARQ transmission if the first feedback message indicates a negative acknowledgment for at least part of the first HARQ transmission.

4. The method of claim 1, wherein the first feedback message includes a single bit to request the second HARQ transmission as a retransmission of the first HARQ transmission.

5. The method of claim 1, wherein the first HARQ transmission is communicated using a first modulation and coding scheme (MCS), the method further comprising:
   determining a second MCS to use for the second HARQ transmission based, at least in part on an MCS indicator or channel quality information in the first feedback message; and
   communicating the second HARQ transmission using the second MCS.

6. The method of claim 5, wherein the channel quality information includes at least of an MCS rejection, channel quality indicators, or signal-to-noise ratios.

7. The method of claim 1, wherein the first HARQ transmission is communicated using a first MCS, and wherein the first feedback message is received using a second MCS different from the first MCS.

8. The method of claim 1, wherein the first feedback message includes a bitmap to indicate which portions of the first HARQ transmission were not successfully decoded by the second WLAN device, wherein the second HARQ transmission includes a partial retransmission of the first HARQ transmission, the partial retransmission including retransmitted portions of the first HARQ transmission based, at least in part, on the bitmap.

9. The method of claim 8, wherein the bitmap includes a plurality of bits associated with corresponding portions of the first HARQ transmission, wherein each portion represents a segment, a code block, a group of code blocks, a time segment, a packet, or a group of packets.

10. The method of claim 8, wherein the bitmap includes a plurality of bits associated with corresponding one or more sub-bands.

11. The method of claim 1, wherein the first feedback message indicates channel quality indicators associated with one or more sub-bands used in the transmission of the first HARQ transmission, the method further comprising:
    determining failed portions of the first HARQ transmission to retransmit based, at least in part, on the channel quality indicators associated with the one or more sub-bands; and
    communicating the second HARQ transmission as a partial retransmission of the first HARQ transmission, wherein the second HARQ transmission includes the failed portions.

12. The method of claim 11, wherein the retransmitted data is included in different sub-bands in the second HARQ transmission.

13. The method of claim 1, wherein the second HARQ transmission is communicated on different sub-bands than were used for the transmission of the first HARQ transmission.

14. The method of claim 1, further comprising:
    determining a maximum quantity of HARQ transmissions for the WLAN; and
    terminating a HARQ process between the first WLAN device and the second WLAN device if the first packet has been retransmitted using the maximum quantity of HARQ transmissions.

15. The method of claim 1, wherein a header of the first HARQ transmissions includes a HARQ indicator for indicating that the first HARQ transmission is formatted according to the HARQ protocol.

16. The method of claim 1, wherein the first HARQ transmission includes a least a second packet intended for a third WLAN device, and wherein the first HARQ transmission is communicated to the second WLAN device and the third WLAN device.

17. The method of claim 1, further comprising, prior to communicating the first HARQ transmission:
    preparing a plurality of encoded bits associated with the first HARQ transmission;
    buffering the plurality of encoded bits in a HARQ buffer; and
    mapping the plurality of encoded bits using a first mapping for the first HARQ transmission, the first mapping associated with a member of a group consisting of a constellation mapper, a binary convolutional encoding (BCC) interleaver, and a low-density parity check (LDPC) mapper.

18. The method of claim 17, further comprising:
    retrieving the plurality of encoded bits from the HARQ buffer; and
    mapping the plurality of encoded bits using a second mapping for the second HARQ transmission.

19. The method of claim 1, wherein the first HARQ transmission includes data and a first set of parity bits associated with the data, the method further comprising:

communicating the second HARQ transmission using incremental redundancy, wherein the second HARQ transmission includes a second set of parity bits associated with the data.

20. The method of claim 1, further comprising:
communicating a first HARQ protocol capability indicator to the second WLAN device to inform the second WLAN device that the first WLAN device is capable of communicating the second HARQ transmission in accordance with the HARQ protocol, wherein the first HARQ protocol capability indicator is signaled in one or an association message, a configuration message for the HARQ protocol, or a header of the first HARQ transmission; and
receiving a second HARQ protocol capability indicator from the second WLAN device indicating that the second WLAN device supports the HARQ protocol, wherein the second HARQ protocol capability is signaled in one of an association message, a configuration message for the HARQ protocol or a header of the first feedback message.

21. The method of claim 1, wherein the first HARQ transmission includes capability information regarding the HARQ protocol and wherein the capability information includes at least one member selected from a group consisting of a HARQ enabled indicator, a type of HARQ, a log likelihood ration (LLR) buffer size, a modulation and coding scheme (MCS) setting, a puncturing parameter, an acknowledgement type, and a scrambling seed.

22. The method of claim 1, further comprising:
communicating the second HARQ transmission in an aggregated media access control (MAC) protocol data unit (A-MPDU), wherein the A-MPDU includes the second HARQ transmission for the first packet and also includes new data associated with a second packet.

23. The method of claim 22, wherein the new data associated with the second packet is encoded as a new first HARQ transmission.

24. The method of claim 1, further comprising:
communicating the second HARQ transmission in an aggregated physical layer protocol data unit (A-PPDU) that aggregates multiple PPDUs, wherein a first PPDU includes the second HARQ transmission for the first packet and a second PPDU includes new data associated with a second packet.

25. The method of claim 1, wherein the first HARQ transmission includes a plurality of codewords, and wherein the first feedback message includes codeword-based feedback.

26. The method of claim 25, further comprising communicating the second HARQ transmission, wherein the second HARQ transmission includes portions of the first packet that map to particular sub-bands or codewords based on the codeword-based feedback.

27. The method of claim 1, further comprising:
omitting portions of the second HARQ transmission to reduce a duration of the second HARQ transmission, the omitted portions including at least one member selected from a group consisting of an interframe space, a signaling header, or a training field.

28. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to implement a hybrid automatic repeat request (HARQ) protocol, the HARQ protocol comprising:
communicating at least a first packet using a first HARQ transmission from the first WLAN device to a second WLAN device;
obtain, from the second WLAN device, a first feedback message for acknowledging the first HARQ transmission, wherein a type of the first feedback message is a HARQ feedback type or a non-HARQ feedback type; and
determining whether to communicate the first packet in a second HARQ transmission to the second WLAN device based, at least in part, on the type of the first feedback message from the second WLAN device.

29. An apparatus for wireless communication, comprising:
a processing system configured to implement a hybrid automatic repeat request (HARQ) protocol;
a first interface configured to output at least a first packet using a first HARQ transmission from the first WLAN device to a second WLAN device;
the first interface configured to obtain, from the second WLAN device, a first feedback message for acknowledging the first HARQ transmission, wherein a type of the first feedback message is a HARQ feedback type or a non-HARQ feedback type; and
the processing system configured to determine whether to output the first packet in a second HARQ transmission to the second WLAN device based, at least in part, on the type of the first feedback message from the second WLAN device.

* * * * *